US012603407B2

(12) United States Patent
Fonseca

(10) Patent No.: US 12,603,407 B2
(45) Date of Patent: Apr. 14, 2026

(54) COMPACT FEED SYSTEM WITH DEVELOPABLE WAVEGUIDE H-PLANE DIRECTIONAL COUPLER

(71) Applicant: EUROPEAN SPACE AGENCY (ESA), Paris (FR)

(72) Inventor: Nelson Fonseca, CV Noordwijk (NL)

(73) Assignee: EUROPEAN SPACE AGENCY (ESA), Paris (FR)

(*) Notice: Subject to any disclaimer, the term of this patent is extended or adjusted under 35 U.S.C. 154(b) by 166 days.

(21) Appl. No.: 18/575,700

(22) PCT Filed: Jul. 2, 2021

(86) PCT No.: PCT/EP2021/068301
§ 371 (c)(1),
(2) Date: Dec. 29, 2023

(87) PCT Pub. No.: WO2023/274552
PCT Pub. Date: Jan. 5, 2023

(65) Prior Publication Data
US 2024/0322411 A1 Sep. 26, 2024

(51) Int. Cl.
*H01P 1/161* (2006.01)
*H01P 5/18* (2006.01)

(52) U.S. Cl.
CPC .............. *H01P 1/161* (2013.01); *H01P 5/182* (2013.01)

(58) Field of Classification Search
CPC ........... H01P 1/161; H01P 5/182; H01Q 3/40; H01Q 13/0258; H01Q 21/0006; H01Q 21/064
See application file for complete search history.

(56) References Cited

U.S. PATENT DOCUMENTS 4,792,770 A 12/1988 Parekh et al.
7,408,427 B1 8/2008 Lee-yow et al.
(Continued)

FOREIGN PATENT DOCUMENTS

JP S56702 A 1/1981
JP S58119204 A 7/1983
WO 2020100189 A1 5/2020

OTHER PUBLICATIONS

P. Bosshard, et al., "Thales Alenia Space HTS/V-HTS Multiple Beam Antennas Sub-systems on the Right Track", European Space Agency, 2016, 5 pages.
(Continued)

*Primary Examiner* — Andrea Lindgren Baltzell
*Assistant Examiner* — Kimberly E Glenn
(74) *Attorney, Agent, or Firm* — NIXON & VANDERHYE P.C.

(57) ABSTRACT

A compact feed system (600) is provided which comprises an orthomode transducer or junction (400) and a waveguide H-plane directional coupler (100). The waveguide H-plane directional coupler may comprise two hollow waveguide sections (110, 120) and a coupling section (130) arranged in between the two hollow waveguide sections for coupling a signal from one hollow waveguide section to another hollow waveguide section. In a transverse cross-section of the waveguide H-plane directional coupler, the hollow waveguide sections may be angled towards the coupling section and delimit a recess (20) formed at an inner side of the waveguide H-plane directional coupler. The orthomode transducer or junction (400) may be positioned at least partially in the recess to increase compactness of the feed system.

11 Claims, 20 Drawing Sheets

(56) References Cited

U.S. PATENT DOCUMENTS

| | | | | |
|---|---|---|---|---|
| 8,493,161 | B2 | 7/2013 | Bosshard et al. | |
| 9,728,863 | B2 * | 8/2017 | Legay | H01Q 21/0006 |
| 9,748,623 | B1 | 8/2017 | Lee-yow et al. | |
| 12,142,803 | B2 * | 11/2024 | Fonseca | H01P 1/161 |
| 2010/0149058 | A1 * | 6/2010 | Bosshard | H01P 1/161<br>343/756 |
| 2011/0181479 | A1 | 7/2011 | Martin et al. | |

OTHER PUBLICATIONS

Raul V. Haro-Baez, et al., "A New 4x4 Rectangular Waveguide Short-Slot Coupler in 3D Printed Technology at Ku-Band", Electronics, vol. 9, No. 4, published Apr. 3, 2020, 9 pages.
Dong-Hun Kim, et al., "Design of Waveguide Short-Slot TWo-Plane Couplers for One-Body 2-D Beam-switching Butler Matrix Application", IEEE Transactions on Microwave Tiieory and Techniques, vol. 64, No. 3, Mar. 1, 2016, pp. 776-784 (9 pages).
Carlos A. Leal-Sevillano, et al., "Novel Dual-Band Single Circular Polarization Antenna Feeding Network for Satellite Communications", The 8th European Conference on Antennas and Propagation (EuCAP 2014), IEEE, 2014, pp. 3265-3269 (5 pages).
Wu Pan, et al., "Design of Terahertz Short-slot Coupler with Curved Waveguide", Progress In Electromagnetics Research Letters, vol. 76, 2018, pp. 27-32 (6 pages).
International Search Report and Written Opinion of the ISA for PCT/EP2021/068301 dated May 6, 2022, 23 pages.

* cited by examiner

COMPACT FEED SYSTEM WITH DEVELOPABLE WAVEGUIDE H-PLANE DIRECTIONAL COUPLER

CROSS-REFERENCE TO RELATED APPLICATIONS

This application is the U.S. national phase of International Application No. PCT/EP2021/068301 filed Jul. 2, 2021 which designated the U.S., the entire contents of which are hereby incorporated by reference.

TECHNICAL FIELD

The presently disclosed subject matter relates to a feed system for use in microwave devices, which feed system comprises an orthomode transducer or orthomode junction, and a waveguide H-plane directional coupler. The presently disclosed subject matter further relates to an arrangement of feed systems, to a waveguide H-plane directional coupler and to an arrangement of waveguide H-plane directional couplers.

BACKGROUND

Feed systems are key components of satellite communication networks, and serve to connect, e.g., a transmitter or receiver to an antenna. Feed systems are commonly composed of subcomponents including an orthomode transducer (OMT) or orthomode junction (OMJ), a waveguide directional coupler, and often one or more filter components. Such feed systems are typically designed using standard components, the order or arrangement of which are customized for a particular system.

Waveguide directional couplers are common components in feed systems, waveguide networks and microwave devices, for coupling electromagnetic signals between various waveguide network ports. These couplers are passive devices, typically used for splitting and/or combining power. Waveguide directional couplers are generally formed by combining two parallel hollow waveguides such that a coupling section is created. A transmission line of one hollow waveguide can thus be coupled with a transmission line of the other waveguide, in either a forward or reverse direction.

There is, however, a need for more compact feed systems which comprise an orthomode transducer or junction and a waveguide directional coupler.

For example, current broadband dual-band dual-polarization K/Ka-band feed systems used in very high throughput satellite (VHTS) multiple beam antenna systems impose a feed spacing of 30 mm or larger, which may result in (too) large satellite antennas or significant performance degradation due to e.g., high grating lobes within the field of view. Future satellite payloads, including ultra high throughput satellite (UHTS) antenna systems with higher spectral density, would benefit from smaller feed systems, and in particular from feed systems having a reduced footprint and volume and preferably without compromising the length and functionality of the feed system.

SUMMARY

It would be advantageous to obtain a more compact feed system which addresses one or more of the problems of existing feed systems.

In accordance with a first aspect of the invention, a compact feed system is provided comprising:

- an orthomode transducer or junction;
- a waveguide H-plane directional coupler comprising:
  - two hollow waveguide sections each providing a respective transmission line in a longitudinal direction of the waveguide H-plane directional coupler;
  - a coupling section arranged in between the two hollow waveguide sections for coupling a signal from one hollow waveguide section to another hollow waveguide section;
- wherein, in a transverse cross-section of the waveguide H-plane directional coupler, the hollow waveguide sections are angled towards the coupling section and delimit a recess formed at an inner side of the waveguide H-plane directional coupler;
- wherein the orthomode transducer or junction is positioned at least partially in the recess.

The above measures provide a feed system which comprises at least an orthomode transducer (OMT) or an orthomode junction (OMJ), and a waveguide H-plane directional coupler which is coupled to the orthomode transducer or junction, for example via one or more filter components. For example, the feed system may be a dual-polarization dual-band feed system, e.g., a dual-polarization K/Ka-band feed system with a two-probe orthomode transducer. Such feed systems are known per se and may be used in antenna systems, for example in satellite communication networks.

As is further known per se, the waveguide directional coupler comprises two hollow waveguide sections. Each hollow waveguide section may have a longitudinal shape with openings at respective longitudinal ends of the hollow waveguide section. These openings may define respective ports of the hollow waveguide section. An electromagnetic signal entering a hollow waveguide section from one end may thereby longitudinally propagate through the hollow waveguide section towards the other end.

Both hollow waveguide sections are coupled via a coupling section. Such a coupling section may allow part of the electromagnetic signal energy to be coupled from one hollow waveguide section into the other hollow waveguide section. In some embodiments, the waveguide directional coupler may represent a four-port coupling circuit in which one of the hollow waveguide sections provides a main transmission line for the electromagnetic signal and having an input port and a direct port, while the other hollow waveguide section provides a coupled transmission line having a coupled port and an isolated port. This type of waveguide directional coupler may be considered to provide a pair of coupled transmission lines, and may be known per se. It is noted that the waveguide directional coupler described previously and in the following is constituted of hollow waveguides, corresponding to standard waveguides formed with electrically conductive material only, e.g., an electrical conductor only. In particular, the standard waveguides are not filled with dielectric material and are also not substrate-integrated waveguides, so the waveguide directional coupler described previously and in the following is not a SIW-type of H-plane directional coupler.

It is known to arrange the hollow waveguide sections in parallel to each other along the longitudinal direction. In a transverse cross-section of the waveguide directional coupler, referring to a cross-section of the waveguide directional coupler in which the cross-sectional plane is orthogonal to the longitudinal direction of the waveguide directional coupler, each hollow waveguide section may have a cross-section which may be defined with an aspect ratio that allows for a single fundamental mode operation. The walls of each hollow waveguide sections may extend along two main dimensions in the cross-section and are generally referred to as the waveguide narrow walls and broad walls, referring respectively to the two walls with the shortest main dimension and the two walls with the longest main dimension. In general, the cross-section may be a rectangular or semicircular or semielliptical cross-section.

Two main categories of waveguide couplers are known: E-plane couplers and H-plane couplers, distinguished between on the main direction along which coupling occurs. E-plane couplers are characterized by a coupling along the direction defined by the electric field of the fundamental mode. Here, coupling occurs through the broad walls of the waveguide transmission lines. H-plane couplers are characterized by a coupling along the direction defined by the magnetic field of the fundamental mode. Here, coupling occurs through the narrow walls of the waveguide transmission lines. In such H-plane couplers, it is known to align the hollow waveguide sections with their broad walls to a common planar surface, for example by adjoining the hollow waveguide sections with their corresponding narrow walls to each other so that they lie in line in the sectional view of the waveguide directional coupler. As a result, the waveguide directional coupler may with their mutually aligned broad walls conform to the common planar surface. Accordingly, the two transmission lines of such a waveguide H-plane directional coupler conform to a common planar surface.

Disadvantageously, feed systems incorporating such waveguide H-plane directional couplers typically have a sizable footprint in the transverse cross-sectional plane of the feed system. This may be problematic in many applications, including but not limited to satellite communication (SATCOM) applications, for example in multiple-feed-per-beam (MFB) feed systems, or in mm-wave terrestrial communication systems (e.g., 5G), high altitude platforms (e.g., balloons, atmospheric satellites) and measurement systems in the millimeter and sub-millimeter wave range (e.g., antenna test facilities, free-space material characterization test benches). While some techniques are known to reduce the footprint of a feed system, these often result in a much longer feed system along the longitudinal direction, or in reduced functionality (e.g., single polarization per band when rather a dual-polarization dual-band feed system is desired for a particular application).

In accordance with the invention as claimed, in the transverse cross-section of the waveguide H-plane directional coupler, the hollow waveguide sections are not mutually aligned to conform to a planar surface but angled towards the coupling section so that a recess is formed at an inner side of the waveguide H-plane directional coupler. In the feed system as claimed, the orthomode transducer or junction is positioned at least partially in the recess in the transverse cross-sectional plane. Thereby, a compact feed system may be obtained, as the waveguide H-plane directional coupler may be wrapped around the orthomode transducer or junction in the cross-sectional plane of the feed system.

As will be also elucidated elsewhere in this specification, the resulting feed system may be significantly reduced in footprint and volume compared to state-of-the-art solutions and without needing to compromise on functionality nor on RF performance. For example, if the feed system is assembled in a matrix configuration, each feed system may fit a 20 mm lattice, which may correspond to a reduction in volume of a factor of two compared to state-of-the-art feed system assemblies operating in K/Ka-band. This corresponds to a lattice of about two wavelengths at the upper operating frequency. This may be highly advantageous in many applications as elucidated above.

In an embodiment, the hollow waveguide sections and the coupling section are shaped so that an H-plane of the waveguide H-plane directional coupler conforms to a developable surface. While in a conventional waveguide H-plane directional coupler the H-plane may be a planar surface, the H-plane may now be mapped onto a developable surface, this being a smooth surface which can be flattened onto a plane without distortion. Such a developable surface may allow the longitudinal directions of the coupled transmission lines to remain parallel while at the same time forming a recess in the transverse cross-sectional plane of the waveguide H-plane directional coupler. This mapping of the shape of the waveguide H-plane directional coupler, and thereby of the H-plane, to a developable surface may elsewhere also be referred to as a 'conformal mapping', whilst the waveguide H-plane directional coupler may elsewhere also be referred to as a 'developable waveguide H-plane directional coupler' or in short as a 'developable coupler', or as a 'rooftop coupler' for embodiments where the waveguide H-plane directional coupler resembles a rooftop, for example a gabled rooftop or a gambrel rooftop, by way of the hollow waveguide sections being angled towards the coupling section.

In an embodiment, the developable surface corresponds to a surface part of a cylinder or rectangular parallelepiped or hexagonal prism.

In an embodiment, the hollow waveguide sections are curved towards each other in the transverse cross-section of the waveguide H-plane directional coupler. As such, the hollow waveguide sections themselves may have a curved shape in the transverse cross-sectional plane, thereby causing the hollow waveguide sections to angle towards each other. As is elucidated elsewhere, the hollow waveguide sections may be curved such that corresponding sides of the waveguide sections may together lie in a curve or any polygonal shape of interest for dual-mode waveguide designs, such as a square or a hexagonal shape.

In an embodiment, the coupling section is curved in the transverse cross-section of the waveguide H-plane directional coupler and has a curvature which follows that of the two hollow waveguide sections. Having a curved coupling section may be advantageous. For example, the curved coupling section may follow a same curvature as the hollow waveguide sections, and as a result of which, the waveguide directional coupler may maintain a constant thickness which may reduce the size of the envelope of the overall feed system, e.g., by avoiding protrusions, and thereby its size.

In an embodiment, at least one of the two hollow waveguide sections has a chamfer or radius on an edge in the transverse cross-section of the waveguide H-plane directional coupler, which edge is nearest to the other hollow waveguide section. For example, the chamfer or radius may be on one or more edges nearest to the coupling section, for example on one or more inner edges. Here, the adjective 'inner' may refer to the edge being inward facing, e.g., towards the recess, rather than outward facing. This embodiment may relate to the following: it has been found that an important aspect of the coupler design is the coupling section, as a conformal mapping to a deformable surface or the like may locally distort the electric field distribution, which may affect the frequency response of the waveguide H-plane directional coupler. The coupling section may be particularly constrained by typical manufacturing limitations, which may impose a minimum distance between the coupled waveguides. It was found that such local distortions may be mitigated by trimming the hollow waveguide sections, thereby adapting their cross-section such that the distance between the waveguide sections can be reduced without impairing the minimum wall thickness imposed on the mechanical design. This adapting of their cross-sections may be achieved providing a chamfer or a radius on one or more inner edges of the waveguide in its cross-section, for example for the inward facing edge(s) nearest to the coupling section or for all edges. Such a chamfer or radius may be applied to the edge between the narrow wall and broad wall at the interior of the waveguide section. It will be appreciated, however, that such an interior chamfer or radius allows the exterior to be also adapted in cross-section. For example, the chamfer or radius may be simultaneously applied to the interior of the hollow waveguide section as well as the exterior of the hollow waveguide section. Further, the chamfer or radius may be simultaneously applied to all edges of the hollow waveguide section. This modification may enable maintaining the wide frequency response of conventional H-plane couplers and is compatible with various manufacturing techniques, including CNC milling and additive layer manufacturing.

In an embodiment, the feed system further comprises a filter for coupling the orthomode transducer or junction to the waveguide H-plane directional coupler. A feed system typically comprises one or more filters. For example, as it known per se, a dual-polarization dual-band feed system may comprise two filters for connecting a two-probe orthomode transducer to the waveguide H-plane directional coupler. In accordance with this embodiment, the filters may be filters which are integrated in the waveguide path connecting for example a two-probe OMT to the directional waveguide coupler. For example, each filter may comprise at least a stub and an iris, wherein the stub is arranged within a convex envelop of the waveguide H-plane directional coupler, the orthomode transducer or junction, and the iris. Here, the stubs fitting within the convex envelop of the coupler, the OMT/OMJ and the iris may elsewhere also be referred to as the filters being ‘inline’ filters. While prior art feed systems use stub filter designs which may protrude from such a convex envelop, in accordance with this embodiment an inline design may be used which may combine a stub and an iris and which is well-suited to address the volume constraints in a feed system since the stub may be arranged in a convex envelop of the other components of the feed system.

It is noted that for enhanced performance, one or more further irises may be added to the waveguide path joining the OMT probes and the waveguide directional coupler, with the further iris(es) still fitting within the same convex envelop.

In a further aspect of the invention, an arrangement is provided comprising a plurality of feed systems as presently disclosed, wherein the feed systems are arranged longitudinally in parallel and transversally in accordance with a lattice. For example, the feed systems may be arranged in a triangular lattice in the cross-sectional plane, with the distance between respective feed systems being for example 20 mm for the particular case of a design in K/Ka-band.

In a further aspect of the invention, a waveguide H-plane directional coupler is provided comprising:

- two hollow waveguide sections each providing a respective transmission line in a longitudinal direction of the waveguide H-plane directional coupler;
- a coupling section arranged in between the two hollow waveguide sections for coupling a signal from one hollow waveguide section to another hollow waveguide section;
- wherein, in a transverse cross-section of the waveguide H-plane directional coupler, the hollow waveguide sections are angled towards the coupling section and delimit a recess formed at an inner side of the waveguide H-plane directional coupler.

The waveguide H-plane directional coupler may also be used in applications beyond feed systems, for example in 3D beam forming networks, such as 3D Butler or hybrid matrices.

In an embodiment of the waveguide H-plane directional coupler, the recess is configured to at least partially receive an orthomode transducer or junction.

In a further aspect of the invention, an arrangement of waveguide H-plane directional couplers is provided, which arrangement comprises at least four waveguide H-plane directional couplers, wherein the four waveguide H-plane directional couplers have four respective coupling sections which are connected by pairs to form a 3D 4×4 hybrid matrix. Such a 4×4 hybrid matrix coupler may be well-suited for use in 3D beam forming networks, such as the aforementioned 3D Butler matrices.

In a further aspect of the invention, an arrangement of waveguide H-plane directional couplers is provided comprising a first waveguide H-plane directional coupler and a second waveguide H-plane directional coupler, wherein the coupling section of the first waveguide H-plane directional coupler is coupled to the coupling section of the second waveguide H-plane directional coupler to form an 8-port coupler. Thereby, two 4-port waveguide H-plane directional couplers may be combined to easily obtain an 8-port coupler. Such an 8-port coupler may be well-suited for use in 3D beam forming networks, in combination with other waveguide components.

It will be appreciated by those skilled in the art that two or more of the above-mentioned embodiments, implementations, and/or aspects of the invention may be combined in any way deemed useful.

Modifications and variations of any one of the feed system, the waveguide H-plane directional coupler or any arrangements thereof, which correspond to the described modifications and variations of another one of these entities, may be carried out by a person skilled in the art on the basis of the present description. In particular, the use of well-known size reduction techniques of common hollow waveguide cross-sections, such as ridged waveguide cross-sections, may be considered to further reduce the footprint of the feed systems, the waveguide H-plane directional coupler or any arrangements thereof, if required for a given application, while preserving all the benefits of the invention and in particular its mechanical simplicity and wide frequency band operation.

BRIEF DESCRIPTION OF THE DRAWINGS

Further details, aspects, and embodiments will be described, by way of example, with reference to the drawings. Elements in the figures are illustrated for simplicity and clarity and have not necessarily been drawn to scale. In the Figures, elements which correspond to elements already described may have the same reference numerals. In the drawings, FIG. 1A schematically shows a top view of a conventional waveguide H-plane directional coupler of the ‘Riblet’-type.

REFERENCE SIGNS LIST

Figure 1A:
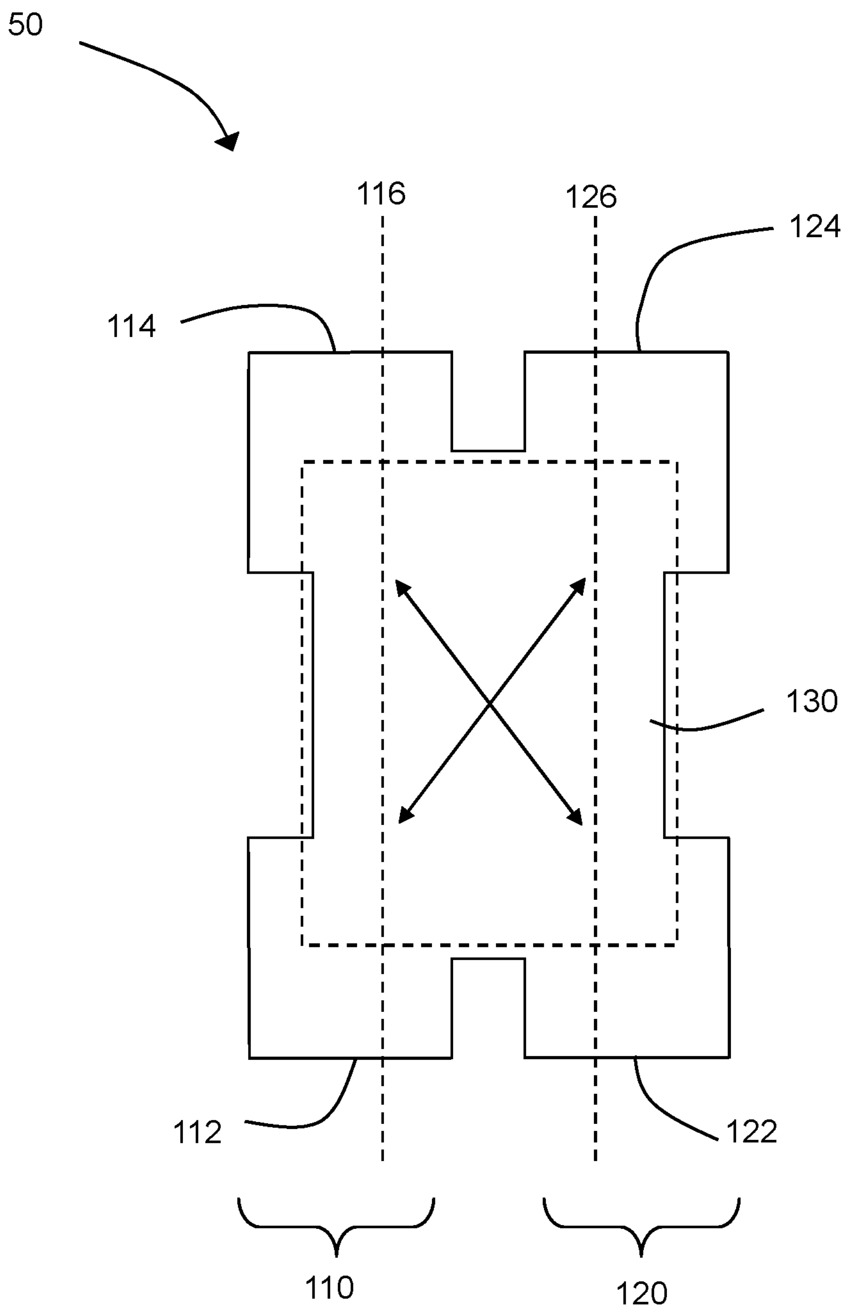
FIG. 1B shows a 3D model of the conventional waveguide H-plane directional coupler of FIG. 1A.

The following list of references and abbreviations is provided for facilitating the interpretation of the drawings and shall not be construed as limiting the claims.

10 magnetic plane (H-plane) of a waveguide H-plane directional coupler
20 recess
50 conventional waveguide H-plane directional coupler
100 developable waveguide H-plane directional coupler
110 waveguide section
112 input port
114 direct port
116 transmission line
120 waveguide section
122 isolated port
124 coupled port
126 transmission line
130 coupling section
140 trimmed edge
150 electric field vectors
170 narrow wall
180 broad wall
210 parallelepiped surface
220 cylindrical surface
230 hexagonal prism surface
310 8-port coupler arrangement
320 4×4 hybrid matrix arrangement
400 orthomode transducer or junction
450 septum polarizer
500 filter
550 filter stub
560 filter iris
600 feed system
610 multi-layer assembly of standalone feed system
700 arrangement of standalone feed systems
710 matrix arrangement of feed systems
720 matrix multi-layer assembly of multiple feed systems

DETAILED DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them. In addition, to facilitate visualization of the operating waveguides, drawings illustrate the inner waveguide cavities, rather than the surrounding electrically conductive material or electrical conductor, unless otherwise stated.

Further, the presently disclosed subject matter is not limited to the embodiments, as feature described herein or recited in mutually different dependent claims may be combined.

Waveguide H-Plane Directional Couplers

Figure 1B:
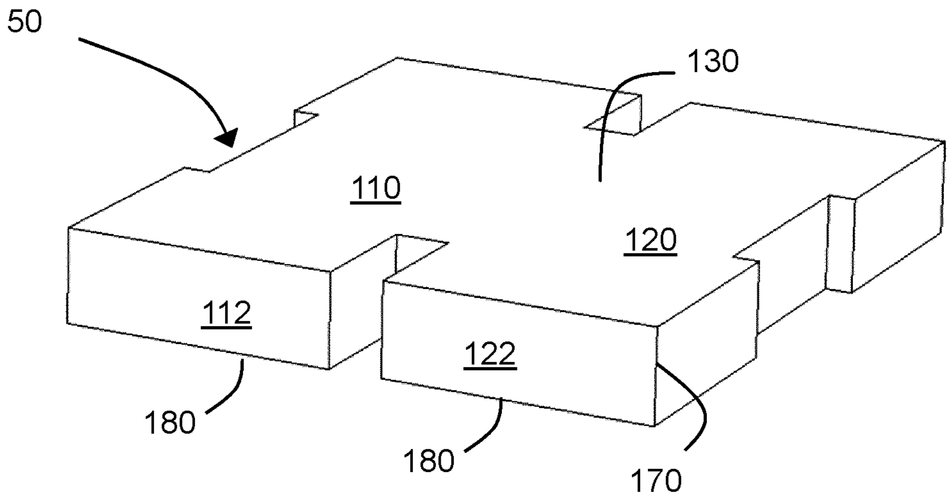

FIG. 1A schematically shows a top view of a conventional waveguide H-plane directional coupler 50, while FIG. 1B shows a 3D model of the conventional waveguide H-plane directional coupler 50. The waveguide H-plane directional coupler 50 may be considered to comprise two hollow waveguide sections 110, 120, each providing a transmission line 116, 126. In FIG. 1A, a first waveguide section 110 is shown providing a transmission line 116 from an input port 112 to a direct port 114. A second waveguide section 120 is shown providing a transmission line 126 passing through an isolated port 122 and a coupled port 124, with reference to the input port 112. The two hollow waveguide sections 110, 120 are arranged to share a coupling section 130, also referred to as a coupling area, in which the two transmission lines 116 and 126 may couple. That is, a signal entering one of the waveguide sections 110 may couple to the other waveguide section 120. The signal may be an electromagnetic signal, having an electric field (E-field) component and a magnetic field (H-field) component perpendicular to the electric field component. Throughout the description, it is assumed that the longitudinal direction is the direction of signal propagation, with the fundamental electromagnetic propagation mode being a transverse electric (TE) mode, meaning that the electric field vector is essentially orthogonal to the longitudinal direction. The conventional waveguide H-plane directional coupler 50 may be of the 'Riblet'-type, with its broad walls 180 conforming to a planar surface (not explicitly shown in FIG. 1B). Riblet-type couplers are well-known H-plane couplers characterized by a large coupling aperture between the two hollow waveguides.

In order to reduce the volume and footprint of a feed system, a waveguide H-plane directional coupler may be codesigned with an OMT/OMJ device. Such feed systems will be described later with reference to FIGS. 8-11. In particular, the waveguide H-plane directional coupler may be shaped to conform to a developable surface 210, 220, 230, illustrated in FIGS. 2-3. A developable surface is defined as a surface that can be mapped onto a plane without distorting the surface. In other words, a developable surface is one which can be bent without being stretched or compressed. Common examples of developable surfaces include prisms, such as hexagonal prisms, cylinders, rectangular parallelepipeds, and the like.

Figure 2A:
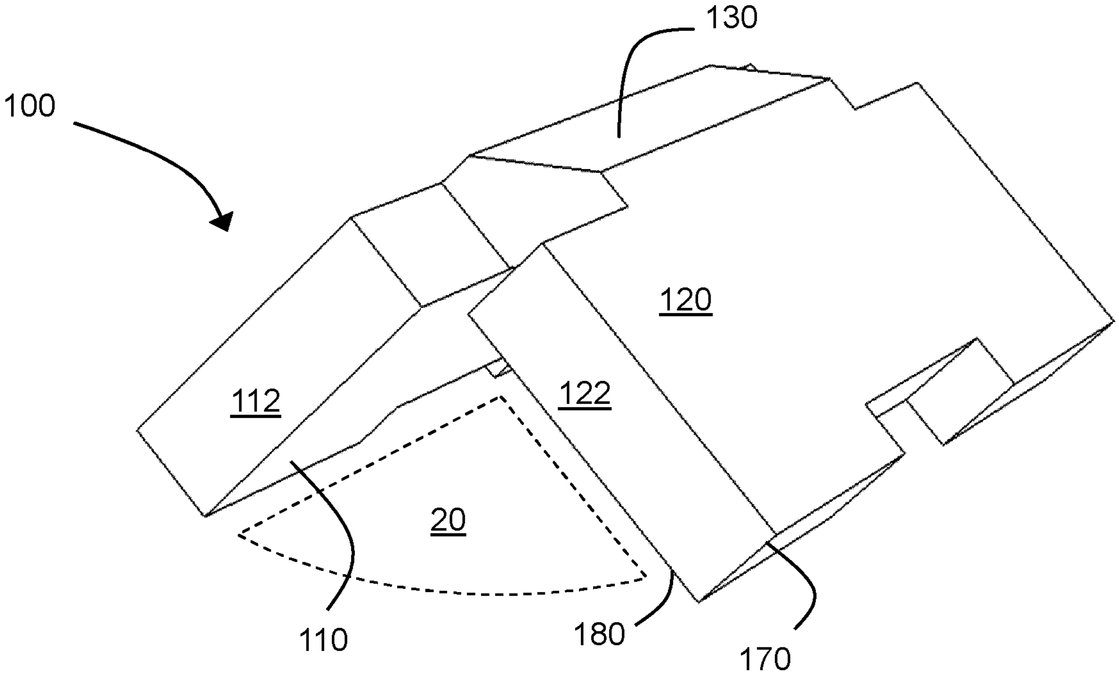
FIG. 2A shows a 3D model of a waveguide H-plane directional coupler according to an embodiment of the invention.

FIG. 2A shows a 3D model of a waveguide H-plane directional coupler 100 according to an embodiment of the invention. Again shown are the waveguide sections 110, 120 and a coupling section 130. The first waveguide section 110 is shown to comprise the input port 112 and the second waveguide section 120 is shown to comprise the isolated port 122. The direct port and the coupled port are not visible in FIG. 2A. In this embodiment, the waveguide H-plane directional coupler 100 has been designed such that it conforms to the surface of a rectangular parallelepiped, forming a rooftop shape. That is, the magnetic plane (H-plane) of the waveguide H-plane directional coupler 100 is mapped to the surface of a parallelepiped. The angled arrangement of the waveguide sections 110, 120 provides a recess 20 (schematically indicated in FIG. 2A) which may be configured to receive, or at least partially receive, another subcomponent of the feed system, such as the OMT or OMJ. This embodiment may be referred to as a rooftop coupler.

Figure 2B:
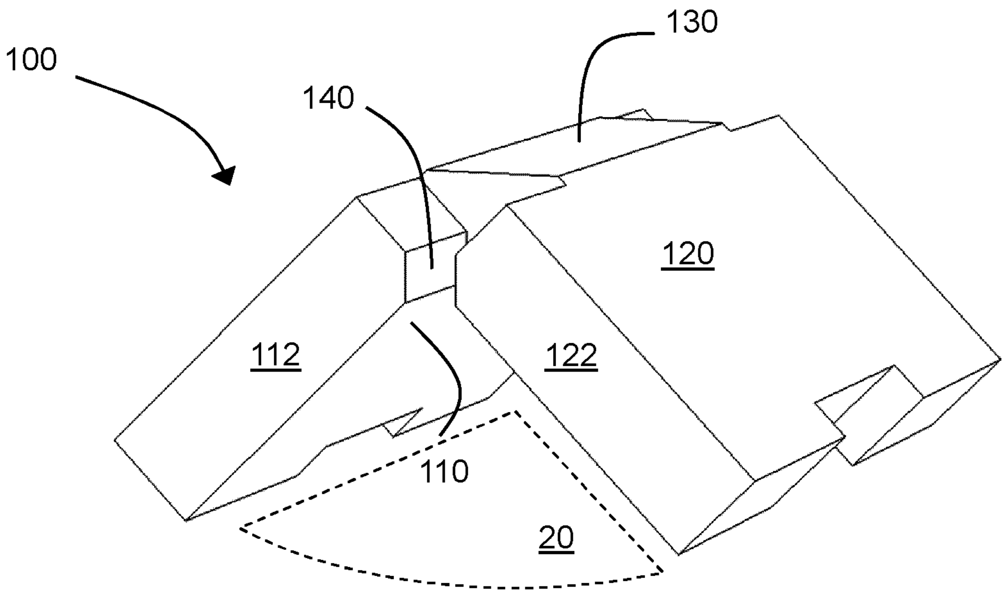
FIG. 2B shows a 3D model of a waveguide H-plane directional coupler according to another embodiment of the invention in which the edges of the hollow waveguide sections nearest to each other are chamfered, FIG. 2C schematically shows a transverse cross-section of the waveguide directional H-place coupler of FIG. 2B.

FIG. 2B schematically shows a waveguide H-plane directional coupler 100 according to an embodiment of the invention. This H-plane coupler is similar to that of FIG. 2A, except that the waveguide sections 110, 120 are trimmed on at least one inner edge 140, such that the coupled waveguide sections 110, 120 may be arranged closer together while maintaining a minimum wall thickness. Examples of such trimming of the waveguide sections 110, 120 include implementing a chamfer or radius on at least one inner edge 140 of the waveguide's cross-section. A waveguide H-plane directional coupler 100 with at least one chamfered inner edge 140 is illustrated in FIG. 2B. Trimming the waveguide sections 110, 120 in such a manner may be achieved using known manufacturing techniques such as additive manufacturing, CNC milling or the like. The minimum acceptable wall thickness may be imposed by the manufacturing technique and mechanical considerations. By implementing such trimming, a wider frequency response may be achieved, equivalent to that of the conventional waveguide H-plane directional coupler of FIG. 1B, as also demonstrated with reference to FIGS. 5C and 5D.

Figure 2C:
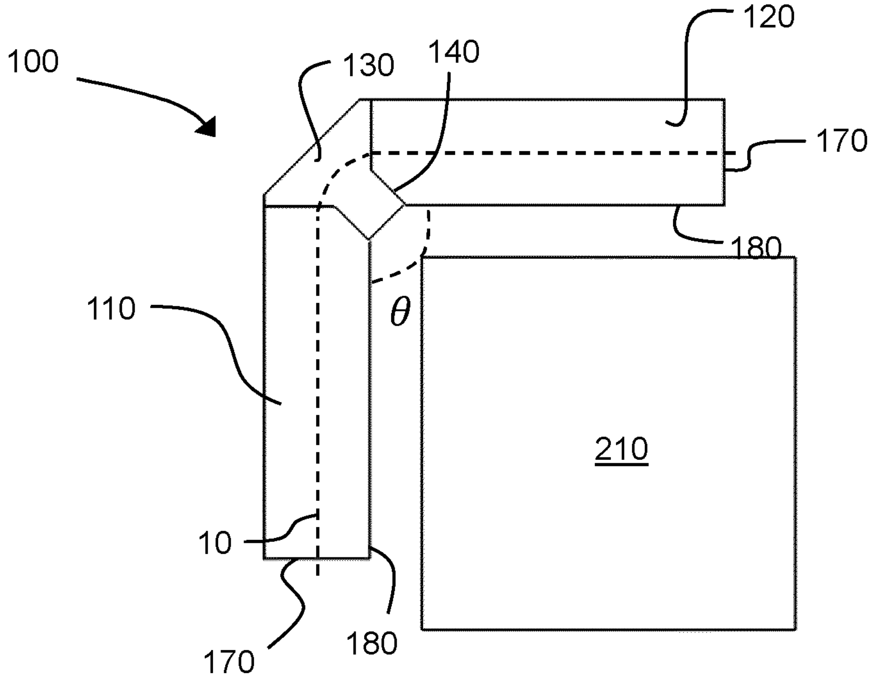
FIG. 2D shows a 3D model of a waveguide H-plane directional coupler according to another embodiment of the invention in which the edges of the hollow waveguide sections nearest to each other are rounded, FIG. 2E schematically shows a transverse cross-section of the waveguide H-plane directional coupler of FIG. 2D.

FIG. 2C shows a cross-section of the waveguide H-plane directional coupler 100 of FIG. 2B. Here, it can be seen that the magnetic plane (H-plane) 10 of the waveguide H-plane directional coupler 100 is mapped to the surface of a parallelepiped 210. As shown in FIG. 2C, the waveguide H-plane directional coupler 100 comprises first waveguide section 110 and second waveguide section 120. Each waveguide section 110, 120 is hollow and arranged to allow propagation of an electromagnetic signal in the longitudinal direction. The two waveguide sections 110, 120 are arranged to be non-planar. That is, the angle θ between the two waveguide sections 110, 120 is less than 180 degrees, being in the example of FIG. 2C θ=90 deg. Examples of other angles are 0 being between 60 and 120 degrees, between 70 and 110 degrees, between 80 and 100 degrees, between 85 and 95 degrees, between 88 and 92 degrees, etc. This angled arrangement of the two waveguide sections 110, 120 provides a recess 20 which may be configured to receive, or at least partially receive, another subcomponent of the feed system, such as the OMT or OMJ.

Figure 2D:
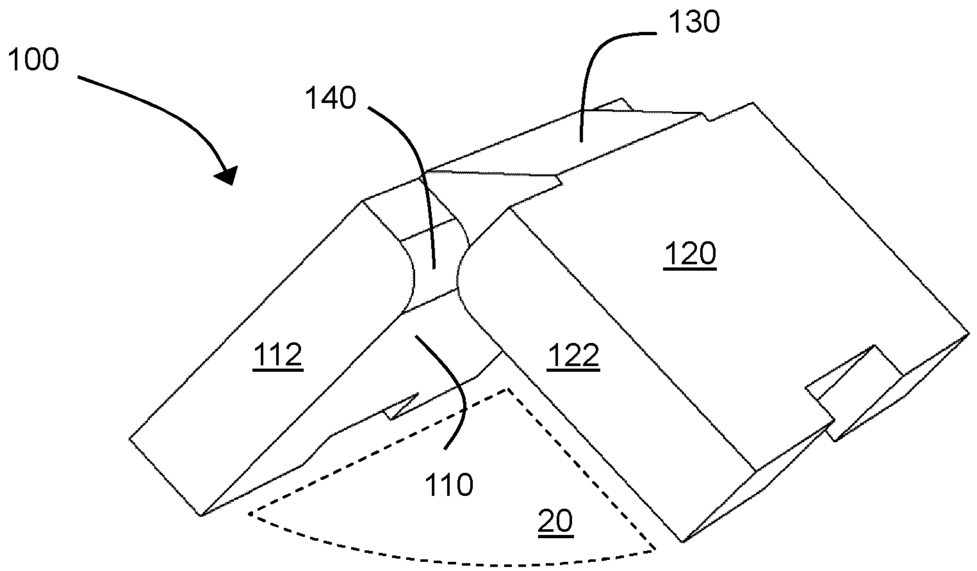
Figure 2E:
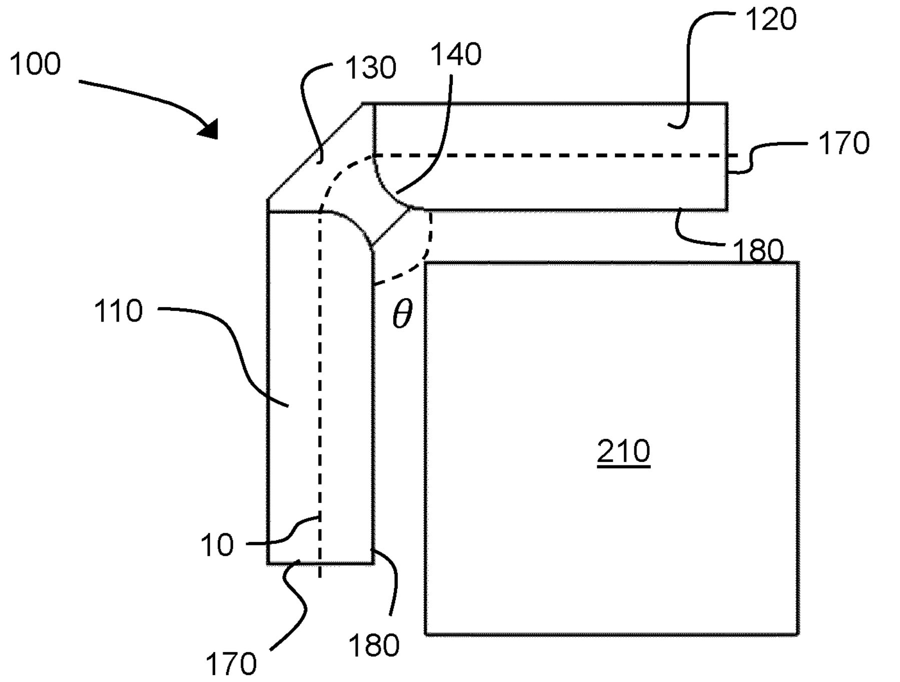

FIG. 2D and FIG. 2E show yet another embodiment of a waveguide H-plane directional coupler 100, showing respectively a 3D model and a transverse cross-section. In this embodiment, the waveguide sections 110, 120 are trimmed implementing a radius on at least one inner edge 140 of the waveguide's cross-section, such that the waveguide sections 110, 120 may be arranged closer together while maintaining a minimum wall thickness.

Figure 3A:
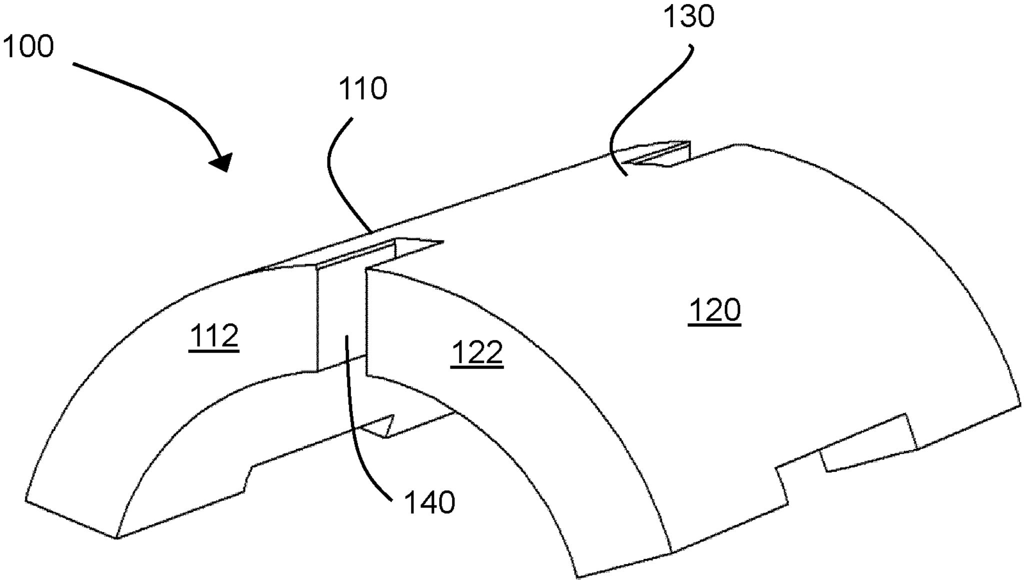
FIG. 3A shows a 3D model of a curved waveguide H-plane directional coupler according to an embodiment of the invention, FIG. 3B schematically shows a transverse cross-section of the waveguide H-plane directional coupler of FIG. 3A.
Figure 3B:
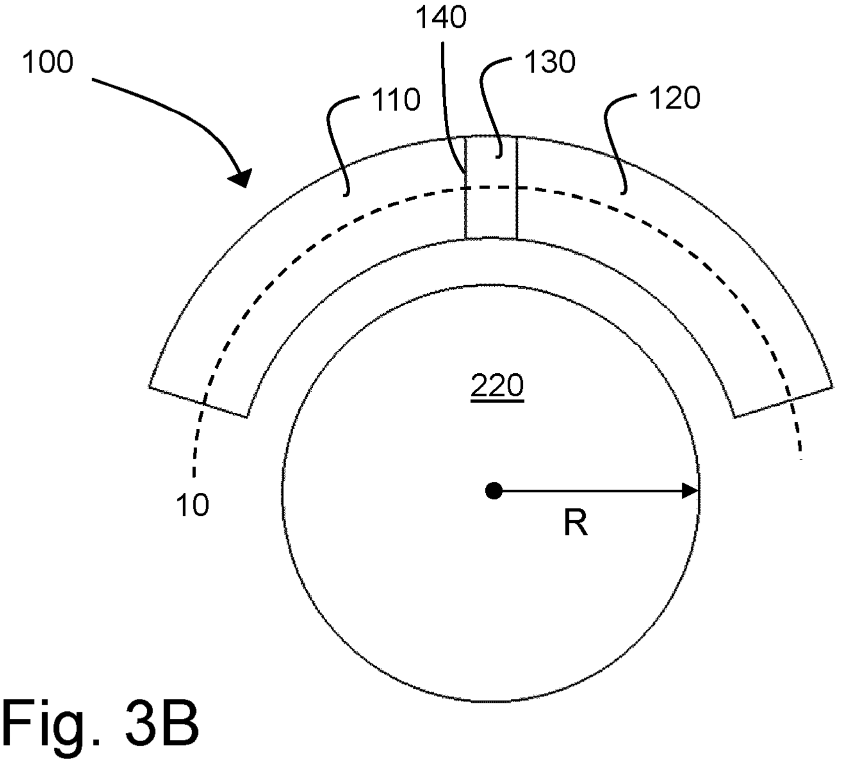
FIG. 3C shows a 3D model of another waveguide H-plane directional coupler according to an embodiment of the invention, FIG. 3D schematically shows a transverse cross-section of the waveguide H-plane directional coupler of FIG. 3C, FIGS. 4A-4C each schematically show an electric field distribution achieved using a waveguide H-plane directional coupler according to a different embodiment of the invention.

FIG. 3A shows a 3D model of a waveguide H-plane directional coupler 100 according to an embodiment of the invention, and FIG. 3B schematically shows a transverse cross-section of such a waveguide H-plane directional coupler 100. The example illustrated in FIGS. 3A and 3B differs from that shown in FIGS. 2A and 2B in that the H-plane 10 of the waveguide H-plane directional coupler 100 has been mapped to a surface of a cylinder 220 having a radius R, rather than to a surface of a rectangular parallelepiped. Such an embodiment of the waveguide H-plane directional coupler 100 may be referred to as a curved coupler. As can be seen from FIGS. 3A and 3B, the waveguide H-plane directional coupler 100 mapped to conform to a surface of a cylinder is also non-planar, as the waveguide sections 110, 120 and the coupling section 130 curve inwards to form a concave recess. That is, the transverse cross-section of the waveguide H-plane directional coupler 100 has a curvature which conforms to the surface of a cylinder 220. The concave recess may be configured to receive, or at least partially receive, another subcomponent of the feed system, such as the OMT or OMJ. It can be seen from FIGS. 3A and 3B that the coupler's coupling section 130 has a substantially same thickness as the hollow waveguide sections 110, 120 and following their curvatures, meaning that the broad walls of the hollow waveguide sections 110, 120 and the corresponding wall of the coupling section 130 all conform to a surface of a cylinder having radius R. It can also be seen from FIGS. 3A and 3B that at least one inner edge 140 of the waveguide sections 110, 120 is designed to maintain a minimum wall thickness as imposed by manufacturing techniques. In this particular case, an optimum performance may be found by having the narrow walls of the two waveguide sections 110, 120 on the side of the coupling section 130 essentially parallel, while the outer narrow walls of the two waveguide sections 110, 120, opposite to the side of the coupling section 130, may be designed to lie in a radial plane along a radial direction in accordance with the curvature of the coupler. This design of the narrow walls on the side of the coupling section 130 corresponds to an asymmetric chamfer where the chamfer dimension along the narrow wall of the hollow waveguide sections 110, 120 is essentially equal to the dimension of the narrow wall itself, while the chamfer dimension along the broad wall of the hollow waveguide sections 110, 120 is significantly smaller. By implementing such trimming, a wider frequency response may be achieved, equivalent to that of the conventional waveguide H-plane directional coupler of FIG. 1B, as also demonstrated with reference to FIGS. 5E and 5F.

Figure 3C:
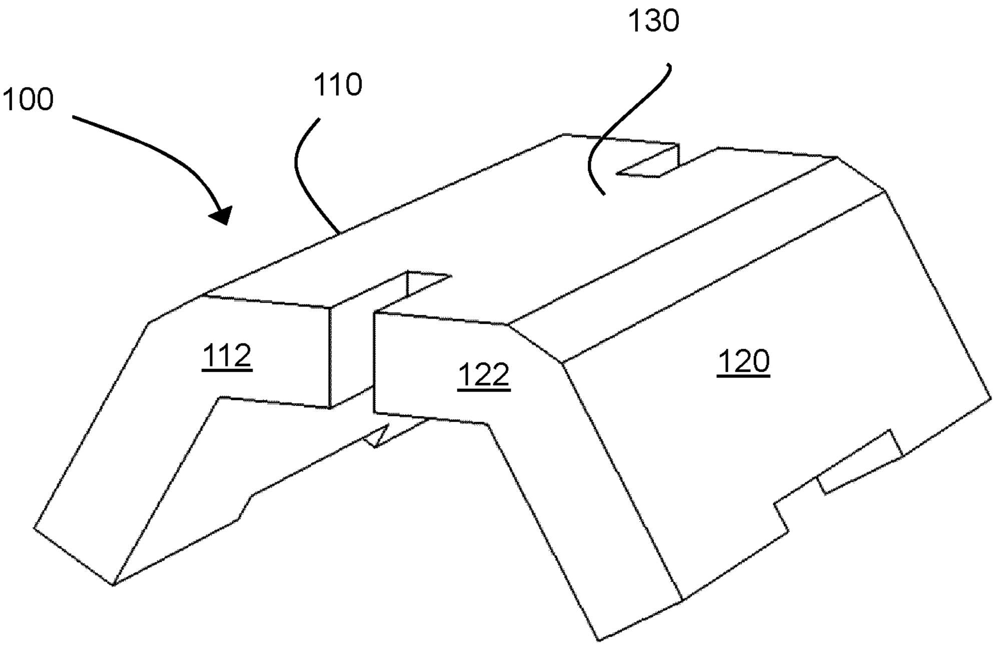
Figure 3D:
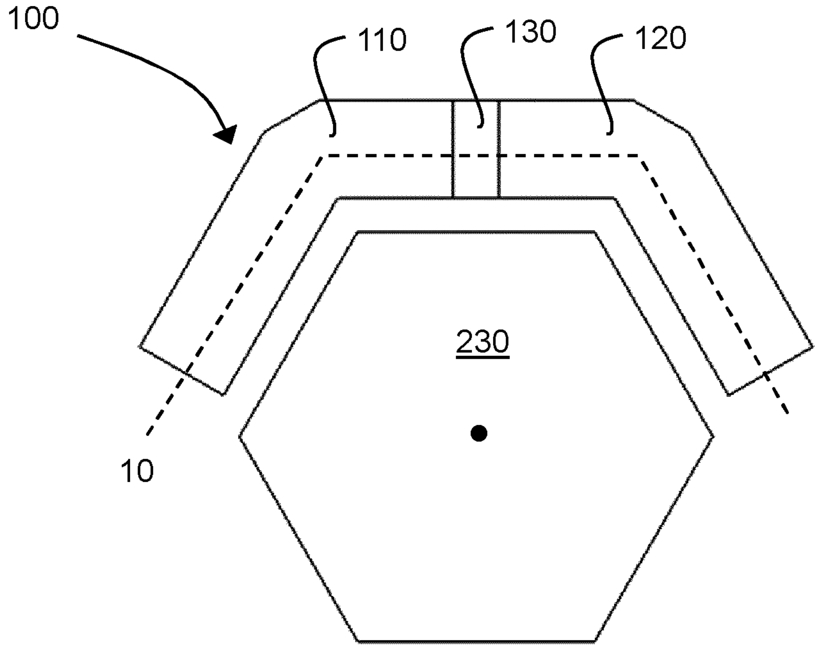

FIG. 3C and FIG. 3D show yet another embodiment of a waveguide H-plane directional coupler 100, showing respectively a 3D model and a transverse cross-section. In this embodiment, the waveguide H-plane directional coupler 100 has been designed such that it conforms to the surface of a hexagonal prism. That is, the magnetic plane (H-plane) of the waveguide H-plane directional coupler 100 is mapped to the surface of a hexagonal prism. In this particular embodiment, the coupling section 130 is implemented in a flat area of the developable surface. Thus, the narrow walls of the waveguide sections 110, 120 toward the coupling section 130 may be designed parallel to each other. By implementing such design, a wider frequency response may be achieved, equivalent to that of the conventional waveguide H-plane directional coupler of FIG. 1B, as also demonstrated with reference to FIGS. 5G and 5H.

In the embodiments described above, e.g., both the rooftop coupler and the curved coupler embodiments and the embodiment conforming to a hexagonal prism, the size and shape of the surface 210, 220, 230 to which the H-plane is mapped, and therefore the size and shape of the resulting recess, may be designed to efficiently house another subcomponent of the feed system. That is, the waveguide H-plane directional coupler 100 may be mapped to a surface of a cylinder 220 having a radius R (or similarly, a surface of a parallelepiped 210 or hexagonal prism 230), based on the size of the subcomponent to be received by the recess.

Figure 8A:
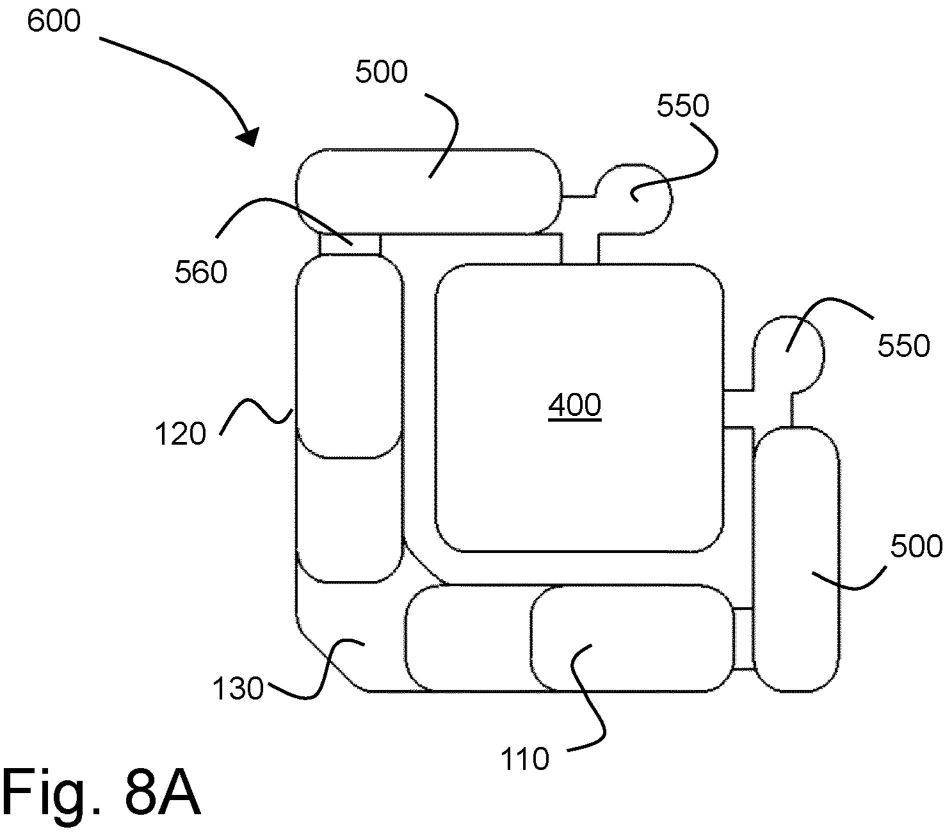
Figure 8B:
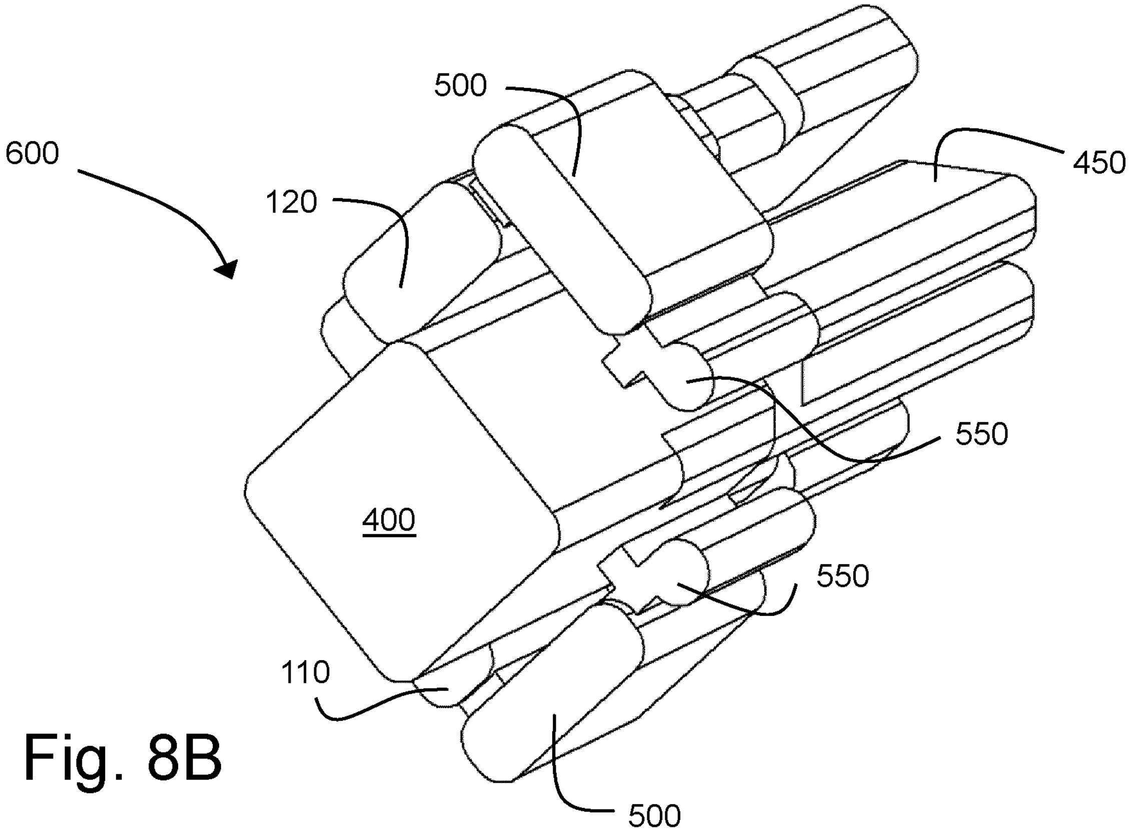

It is noted that for feed systems, the cross section of the surface to which the waveguide H-plane directional coupler 100 is mapped may generally be square or circular, corresponding to a subcomponent waveguide cross section compatible with dual-mode operation of interest for dual-polarized and/or circularly polarized feed systems. A particular case of interest is θ=90 deg as this provides a recess which is well suited to receive an OMT or OMJ with a square common waveguide cross-section, as also illustrated in FIGS. 8A and 8B. In case a ridged waveguide cross-section is implemented for further size reduction, as known per se, the convex envelope of the ridged waveguide cross-section, which may be square or circular, may serve as reference surface to map the waveguide H-plane directional coupler.

Figure 4A:
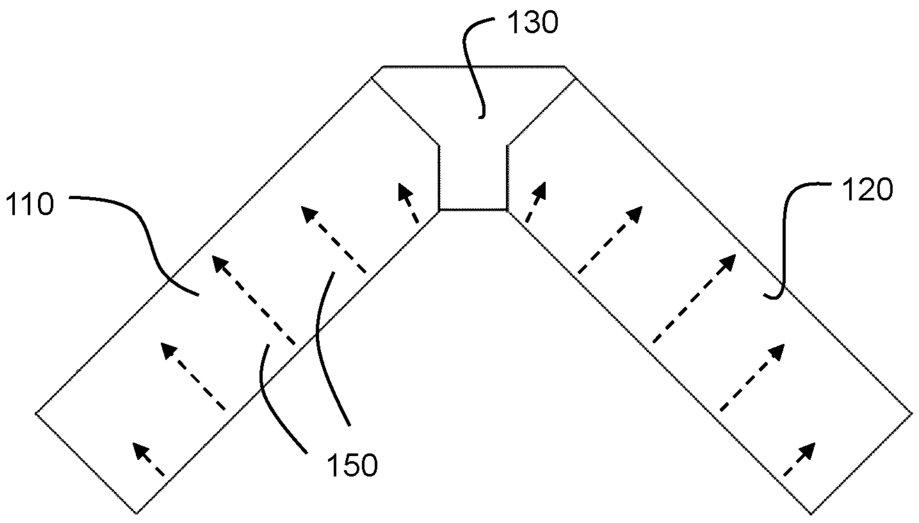
Figure 4B:
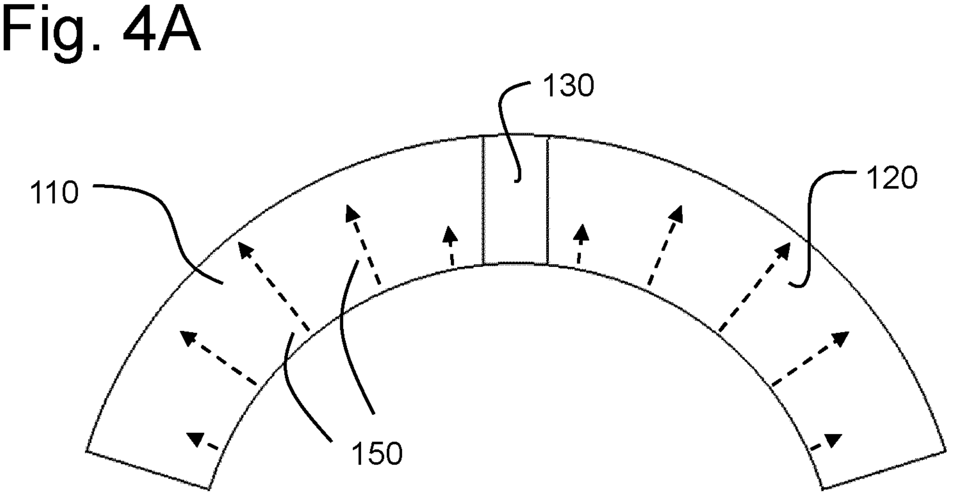
Figure 4C:
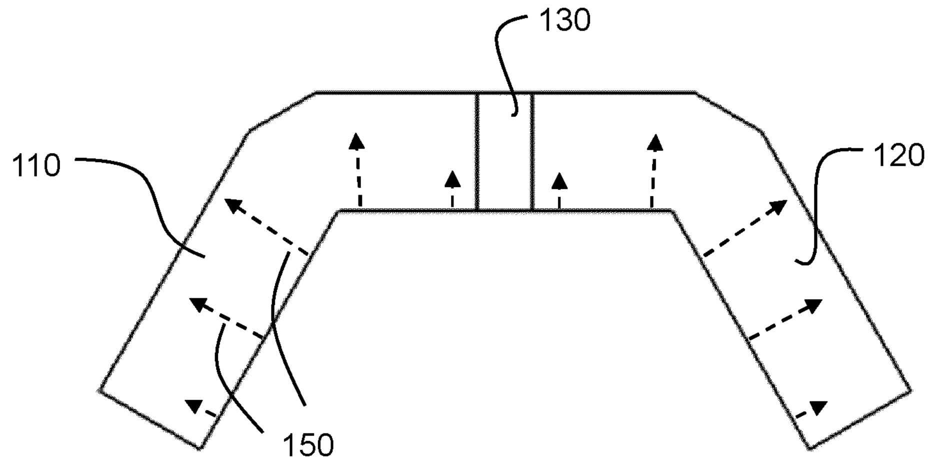

As shown in FIGS. 2A to 3D, in all of the above-described embodiments, the longitudinal directions of both waveguide sections 110, 120 are straight and parallel. The electromagnetic signal propagates in the longitudinal direction, e.g., orthogonal to the in-page plane when referring to FIGS. 2C, 2E, 3B, 3D. As such, the waveguide H-plane directional coupler 100 operates as an H-plane coupler, as coupling occurs through the narrow wall of the hollow waveguides. As the H-plane of the waveguide H-plane directional coupler 100 is mapped to conform to a surface of, e.g., a parallelepiped 210 or a cylinder 220 or a hexagonal prism 230, the electric field (E-field) distribution 150 is locally distorted. That is, the main electric field direction of the first waveguide section 110 is not parallel to the main electric field direction of the second waveguide section 120. This is illustrated in FIGS. 4A to 4C, which show the electric field vectors 150, having a cosine field intensity distribution along the developable surface to which the waveguide H-plane directional coupler is mapped and a direction locally normal to that surface, in a transverse cross section of a rooftop coupler (FIG. 4A), a curved coupler (FIG. 4B) and a coupler mapped to a hexagonal prism (FIG. 4C).

The nonparallel nature of the electric field vectors 150 through each of the two waveguide sections 110, 120 may introduce local distortion of the electric field distribution, which may affect the response of the coupler over frequency. The coupling section 130 may be constrained by the thickness of the walls of the waveguide H-plane directional coupler 100 and the manufacturing techniques, e.g., CNC milling, used to produce the waveguide H-plane directional coupler 100. This may constrain the distance between the waveguides 110, 120. This is illustrated in FIG. 2A in the case of waveguides 110, 120 with a rectangular cross section. This affects the shape and size of the coupling section 130. In some embodiments, however, the response of the waveguide H-plane directional coupler 100 over frequency may be improved by trimming the waveguide sections 120, 130 on at least one inner edge 140, such that the coupled waveguide sections 110, 120 may be arranged closer together, reducing the size of the coupling section 130. Examples of such trimming of the waveguide sections 110, 120 include implementing a chamfer or radius on the inner edges 140 of the waveguide's cross-section, as illustrated in FIGS. 2B and 2D, respectively. Trimming the waveguide sections 110, 120 in such a manner may be achieved using known manufacturing techniques such as additive manufacturing, CNC milling or the like. By implementing such trimming, a wider frequency response may be achieved, at least equivalent to that of the conventional waveguide H-plane directional coupler of FIG. 1B.

The design of the couplers according to embodiments of the invention were analyzed using the electromagnetic solver ANSYS HFSS, based on the Finite Element Method (FEM) in the frequency domain. The analyses results are illustrated in FIGS. 5A-5H.

Figure 5A:
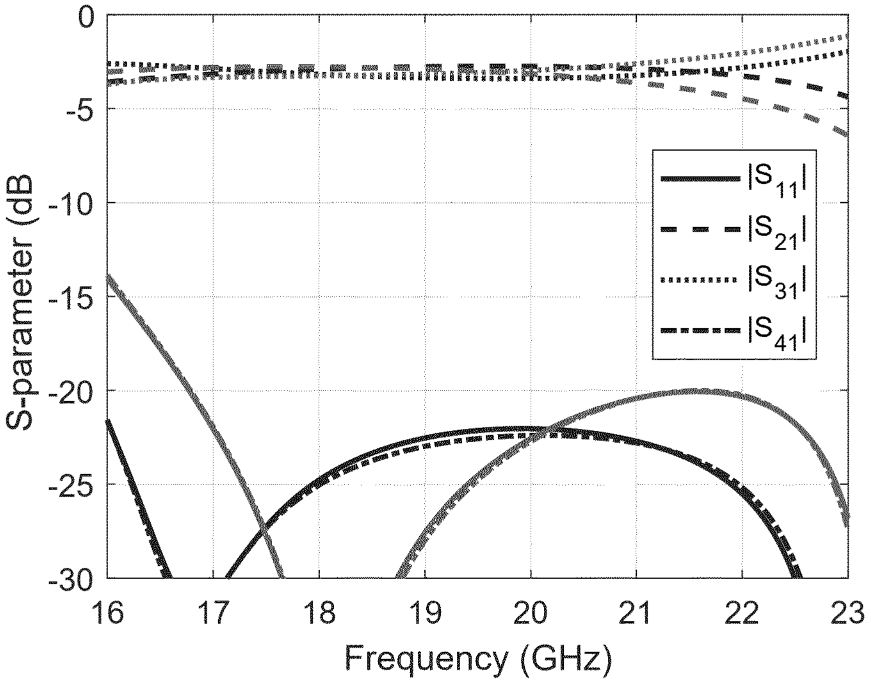
FIG. 5A shows a graph of scattering parameters achieved using a conventional H-plane coupler design compared to a rooftop coupler design according to an embodiment of the invention.
Figure 5B:
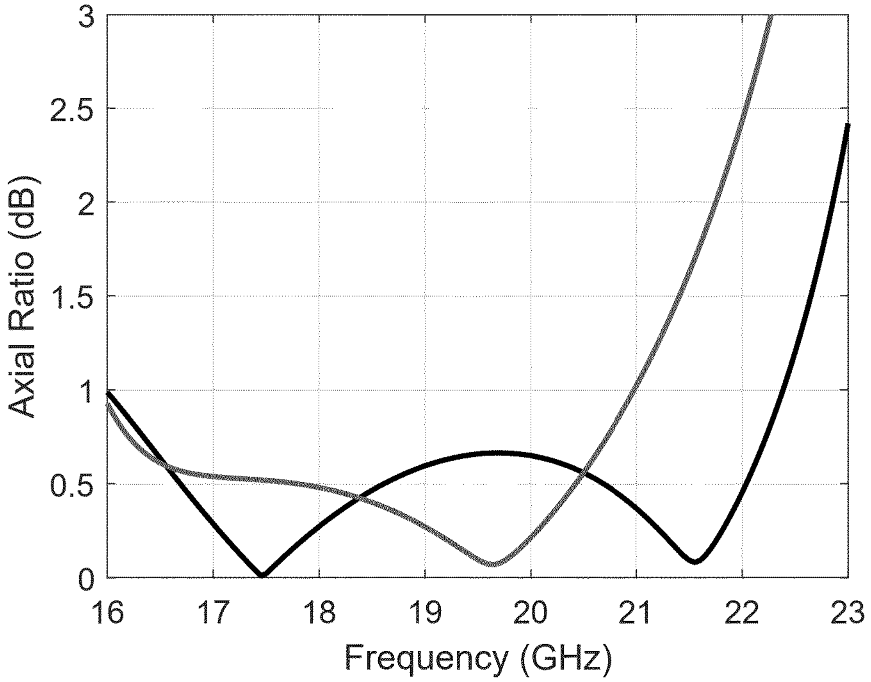
FIG. 5B shows a graph of the axial ratio achieved using a conventional H-plane coupler design compared to a rooftop coupler design according to an embodiment of the invention.
Figure 5C:
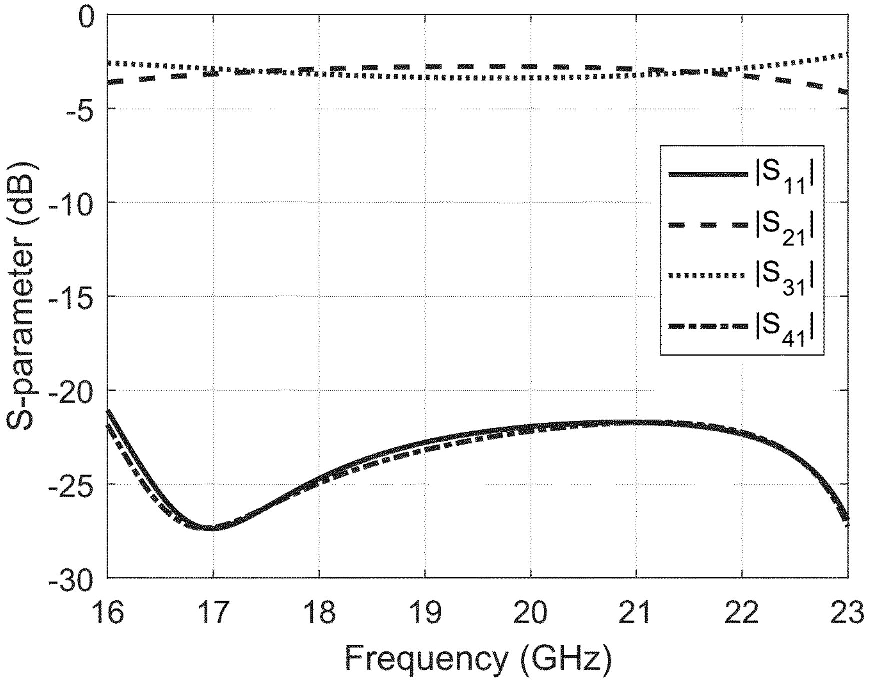
FIG. 5C shows a graph of scattering parameters achieved using a rooftop coupler design according to an embodiment of the invention.
Figure 5D:
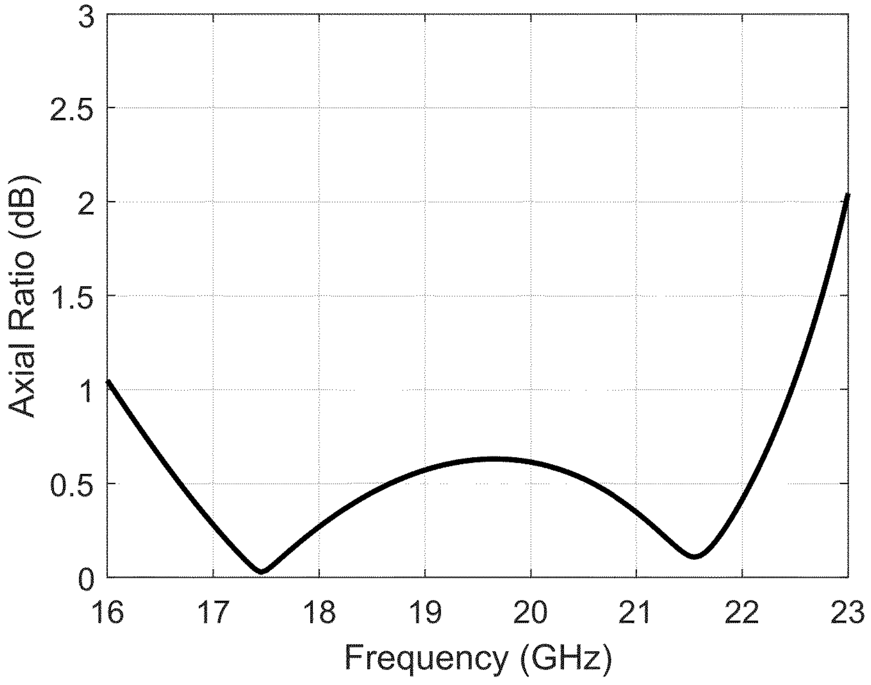
FIG. 5D shows a graph of axial ratio achieved using a rooftop coupler design according to an embodiment of the invention.
Figure 5E:
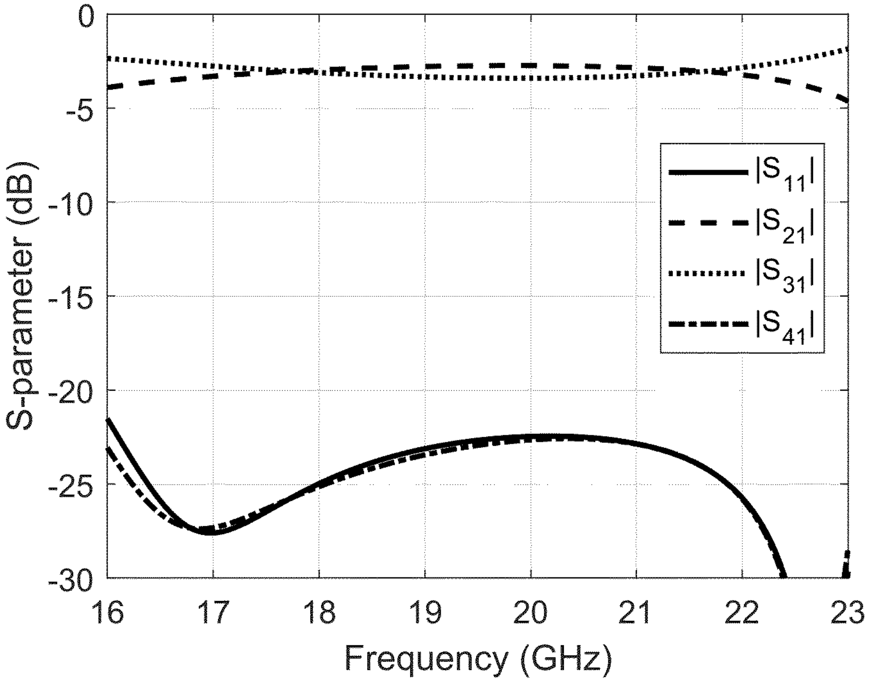
FIG. 5E shows a graph of scattering parameters achieved using a curved coupler design according to an embodiment of the invention.
Figure 5F:
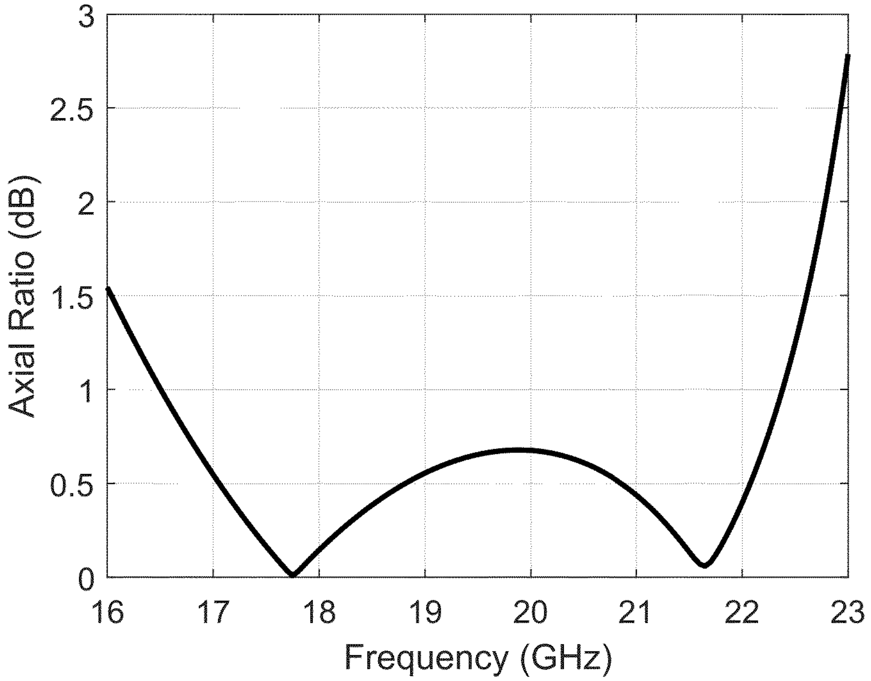
FIG. 5F shows a graph of axial ratio achieved using a curved coupler design according to an embodiment of the invention.
Figure 5G:
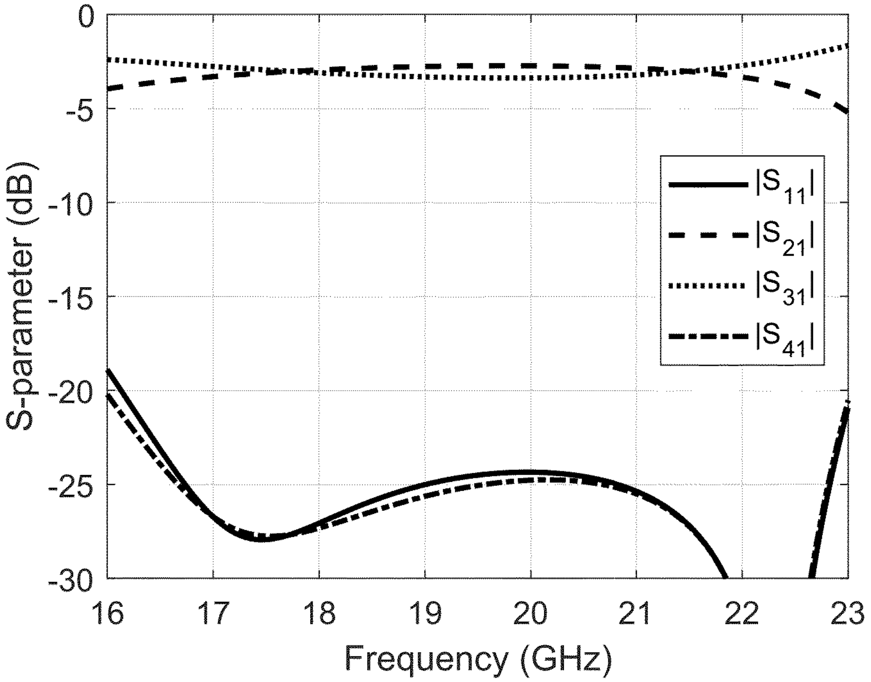
FIG. 5G shows a graph of scattering parameters achieved using a coupler design conforming to a surface of a hexagonal prism according to an embodiment of the invention.
Figure 5H:
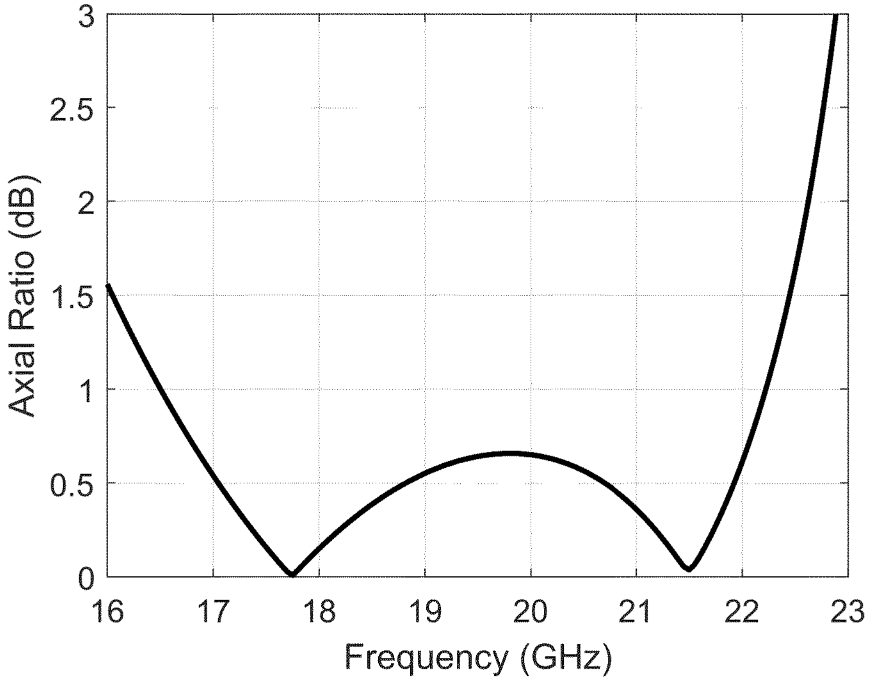
FIG. 5H shows a graph of axial ratio achieved using a coupler conforming to a surface of a hexagonal prism according to an embodiment of the invention, FIG. 6 schematically shows an arrangement of waveguide H-plane directional couplers according to an embodiment of the invention, FIG. 7 schematically shows an arrangement of waveguide H-plane directional couplers according to an embodiment of the invention, FIG. 8A schematically illustrates a compact feed system according to an embodiment of the invention, FIG. 8B schematically shows a 3D model of a feed system according to an embodiment of the invention.

FIG. 5A shows a graph of scattering parameters achieved using a conventional waveguide H-plane directional coupler design (black lines) compared to equivalent scattering parameters achieved using a rooftop coupler design (grey lines), according to an embodiment of the invention, corresponding to the waveguide couplers illustrated in FIGS. 1B and 2A, respectively. The four lines illustrated on the graph correspond to the terms in the first column of the scattering matrix (S-matrix), with the solid line, the dashed line, the dotted line, and the dash-dotted line illustrating the reflection at the input port 112, the transmission to the direct port 114, the transmission to the coupled port 124 and the transmission to the isolated port 122, respectively. As shown in the graph, a wide band response is observed for the conventional H-plane coupler, ranging from about 17 to 22 GHZ, and mostly limited by the amplitude unbalance between the direct port 114 and coupled port 124. These results demonstrate a bandwidth greater than 5 GHz in K-band, which is consistent with standard H-plane couplers. Standard H-plane couplers exhibit a fractional bandwidth of 25 to 30%. The frequency bandwidth is reduced in the case of the rooftop coupler with standard rectangular waveguides. The performance degradation is mainly visible in the upper part of the frequency range, with the amplitude unbalance degrading quickly above approximately 20.5 GHZ. This leads to a fractional bandwidth below 20%, which may still be acceptable for some specific applications. Advantageously, such a rooftop coupler design provides a recess for an OMT/OMJ or other components of a feed system, which may outweigh performance degradations in specific applications. FIG. 5B shows a graph of axial ratio achieved using a conventional waveguide H-plane directional coupler design (black line) compared to a graph of the same axial ratio achieved using a rooftop coupler design (grey line), according to an embodiment of the invention. The axial ratio is provided as a good metric of the combined amplitude balance and phase difference between the direct port and the coupled port in the case of a hybrid coupler design, e.g., a 3 dB coupler design. These results confirm the degradation of the amplitude balance above 20.5 GHz when comparing the rooftop coupler to a conventional H-plane coupler. FIGS. 5C and 5D are similar types of graphs as FIGS. 5A and 5B, respectively, but show the performance of a rooftop coupler with waveguides 110, 120 trimmed on at least one inner edge 140 as illustrated in FIG. 2B, according to an embodiment of the invention. These results demonstrate the benefits of trimming the waveguides 110, 120 to reduce the distance between them while preserving a minimum wall thickness as imposed by a manufacturing technique, e.g., CNC milling, as a wide bandwidth is obtained, similar to that of a conventional H-plane coupler. FIGS. 5E and 5F are similar type of graphs as FIGS. 5A and 5B, respectively, but show the performance of a curved coupler, according to an embodiment of the invention. FIGS. 5G and 5H are similar types of graphs as FIGS. 5A and 5B, respectively, but show the performance of a coupler mapped to a hexagonal prism, according to an embodiment of the invention. Besides the rooftop coupler without trimmed inner edges, all described designs have been found to provide very similar performance in terms of scattering parameters and fractional frequency bandwidth, thus indicating there is sufficient freedom in defining the surface to which the H-plane is conformed to, with the goal to reduce as much as possible the convex envelop containing the H-plane directional coupler and any component contained at least partially in the recess. The numerical results reported in FIGS. 5A-5H all refer to hybrid coupler designs, e.g., 3 dB coupler designs that split equally the input power between the direct port 114 and the coupled port 124, while introducing a phase delay of 90 degrees in the coupled port 124 with reference to the direct port 114. However, the amplitude unbalance between the direct port 114 and coupled port 124 may be adjusted changing the length of the coupling section, as generally done in H-plane couplers with a single and large coupling section, such as Riblet couplers. In this respect, the proposed waveguide H-plane directional couplers provide the same flexibility, of interest for the design of advanced feed systems combined with two-probe OMT/OMJ components. In particular, the amplitude unbalanced may be tuned to recover the undesired cross-polarization component resulting from the use of two-probe OMT/OMJ components in compact feed systems, which is known per se.

Waveguide H-Plane Directional Coupler Arrangements

Figure 6:
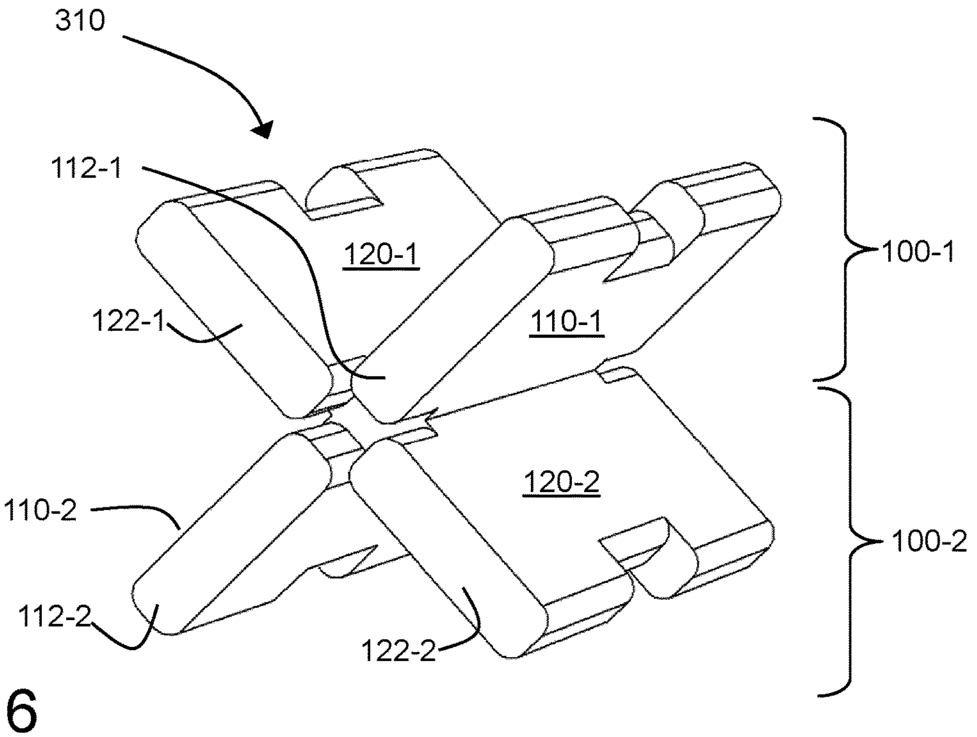
Figure 7:
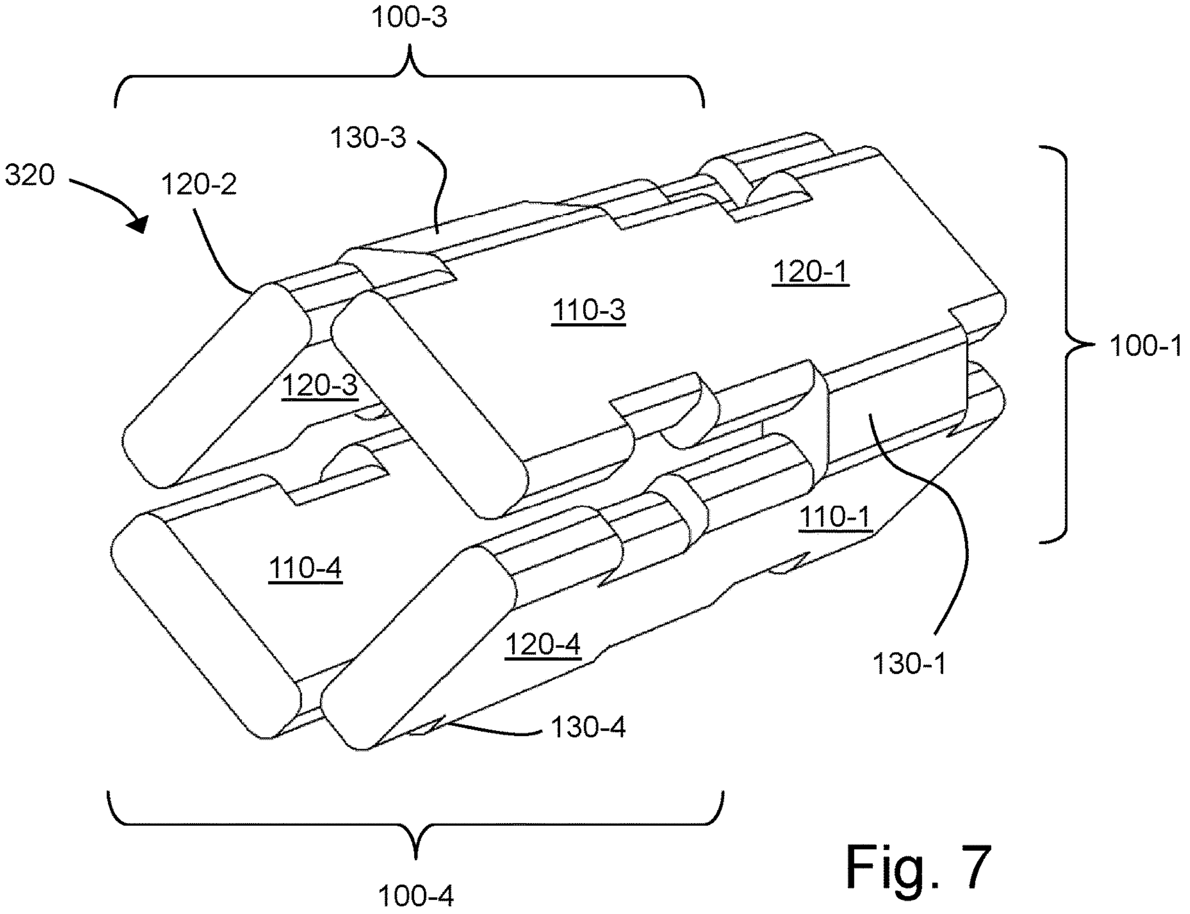

The waveguide H-plane directional couplers described herein may be used in an arrangement of waveguide H-plane directional couplers. FIGS. 6 and 7 show two examples of such arrangements.

Referring now to FIG. 6, two waveguide H-plane directional couplers 100-1, 100-2 are arranged to form an 8-port coupler 310. As shown in the figure, the two waveguide H-plane directional couplers 100-1, 100-2 are arranged such that the coupling section 130 of the first waveguide H-plane directional coupler 100-1 is coupled to the coupling section 130 of the second waveguide H-plane directional coupler 100-2. That is, the waveguide couplers are arranged to have a single coupling section 130, shared by both waveguide couplers. In the figure, the coupling section 130 is in the center of the arrangement, e.g., the center of the cross-shape formed by the two waveguide H-plane directional couplers 100-1, 100-2. The 8-port coupler 310 may serve as subcomponent in beam forming networks and microwave devices. The 8-port coupler 310 also provides a number of recesses which may be configured to receive, or at least partially receive, another subcomponent of the beam forming network and more generally of the microwave device.

FIG. 7 shows a 4×4 hybrid matrix arrangement 320 comprising four waveguide H-plane directional couplers 100-1, 100-2, 100-3, 100-4, of which three couplers 100-1, 100-3, 100-4 are visible. In contrast to the arrangement shown in FIG. 6, the arrangement shown in FIG. 7 has a total of four distinct coupling sections, of which three coupling sections 130-1, 130-3, 130-4 are visible in FIG. 7. The coupler 100-1 has its two output ports connected to one input port of couplers 100-3 and 100-4. In a similar way, not visible in FIG. 7, the coupler 100-2 has its two output ports connected to the two remaining input ports of couplers 100-3 and 100-4. Thus, the four waveguide H-plane directional couplers 100-1, 100-2, 100-3, 100-4 are connected by pairs, the pair composed of the waveguide H-plane directional couplers 100-3, 100-4 being rotated 90 degrees with respect to the pair composed of the waveguide H-plane directional couplers 100-1, 100-2. This arrangement of directional couplers corresponds to a hybrid matrix arrangement which is know per se. However, the use of a developable waveguide H-plane directional coupler according to an embodiment of the invention, results in a very compact 4×4 hybrid matrix arrangement without waveguide cross-overs, which may serve as subcomponent in more advanced beam forming networks and microwave devices. The 4×4 hybrid matrix arrangement 320 also provides a recess, in the central area of the matrix arrangement, which may be configured to receive another subcomponent of the beam forming network and more generally of the microwave device.

Feed Systems

A waveguide H-plane directional coupler 100 such as those described thus far may be used as a subcomponent within a compact feed system 600. A compact feed system 600 may comprise, in addition to at least one waveguide H-plane directional coupler 100, an orthomode transducer or junction (OMT/OMJ) 400 and, optionally, a filter 500 and another orthomode transducer, such as a septum polarizer 450, to produce a dual-band dual-polarization feed system. In this case, the OMJ introduce a reduction in the common waveguide cross-section to provide below cut-off filtering along the longitudinal direction, such that only the upper frequency band or frequency bands propagate through the common waveguide to the next component, e.g., a septum polarizer. A feed system may also comprise multiple sub-assemblies of coupler, orthomode junction and filters, each relative to an operative sub-band, to provide a multiple band feed system, for example a K/Ka Q/V multiple band feed system.

FIG. 8A schematically illustrates a transverse cross-section of a compact feed system 600 according to an embodiment of the invention, and FIG. 8B schematically shows a 3D model of a feed system 600 according to an embodiment of the invention. As shown in FIGS. 8A and 8B, an OMT or OMJ 400 may be arranged to be at least partially received by a recess formed by the angle between the waveguide sections 110, 120 of the waveguide H-plane directional coupler 100. Also shown in FIGS. 8A and 8B are a plurality of filters 500, each comprising a filter stub 550 and a filter iris 560. However, it is to be understood that filters are optional, and in some embodiments, the feed system 600 comprises at least one waveguide H-plane directional coupler 100 and an OMT 400, without a filter component, for example in single-band dual-polarization feed systems. In other embodiments, the feed system 600 may additionally comprise one or more filters 500, which may comprise a filter stub 550, and a filter iris 560, although a filter stub 550 or a filter iris 560 are not required.

Although in FIGS. 8A and 8B, the waveguide H-plane directional coupler 100 is illustrated as a rooftop H-plane directional coupler, the invention is not so limited. That is, a curved coupler such as that shown in FIGS. 3A and 3B or a coupler mapped to a surface of a hexagonal prism such as that shown in FIGS. 3C and 3D may be similarly used. In some embodiments, the shape of the waveguide H-plane directional coupler 100 may be determined based on the shape of the OMT/OMJ 400 which is to be received in the recess of the waveguide H-plane directional coupler 100. In some embodiments, the waveguide H-plane directional coupler 100 is designed to conform to a shape corresponding to a specific OMT/OMJ 400. By using a waveguide H-plane directional coupler 100 designed to conform to the shape of the OMT/OMJ 400, the footprint and volume of the feed system 600 may be reduced, without adversely affecting the length of the feed system 600. In case a ridged waveguide cross-section is implemented for further size reduction, as known per se, the convex envelope of the ridged waveguide cross-section, which may be square or circular, may serve as reference surface to map the waveguide H-plane directional coupler.

In some embodiments, the feed system 600 may comprise at least one filter 500. The filter 500 may comprise at least one filter iris 560 and/or a filter stub 550. The filter 500 is also designed to conform to the shape of the OMT/OMJ so that the combined H-plane directional coupler and filters are wrapped around the two-probe OMT/OMJ, reducing the convex envelop of the assembly. The filter is referred to as an in-line filter, as it does not include protruding filter elements such as multiple parallel stubs as commonly done in multiple band feed systems. It is noted that the stub 550 of the in-line filter may be arranged within a convex envelop of the waveguide directional coupler 100, the OMT/OMJ 400, or the iris 560. An in-line filter 500 comprising both a stub 550 and an iris 560 may be particularly suitable for highly compact designs, as such a filter may be suitable for use in applications having significant volume constraints. Moreover, such a design is compatible with a waveguide directional coupler 100 having an H-plane which has been mapped to a developable surface, e.g., wrapped around the common waveguide, as described above.

When the rooftop coupler is integrated into a feed system design 600, such as a very compact dual-band dual-polarization feed system, the feed system 600 may fit into a square footprint of approximately 18 mm side, which is approximately one wavelength, $\lambda$, of the lowest operating frequency of interest at K-band—that is, a footprint having an area of approximately 324 $mm^2$ or an area of $\lambda^2$ at the lowest operating frequency. In the case of a stand-alone feed mechanical design in which the metallic wall thickness is at least 1 mm, the feed system design would fit into a circle of diameter 27 mm, which is significantly smaller than the ~35 mm diameter occupied by known standalone dual-band dual-polarization K/Ka-band feed systems.

Figure 9A:
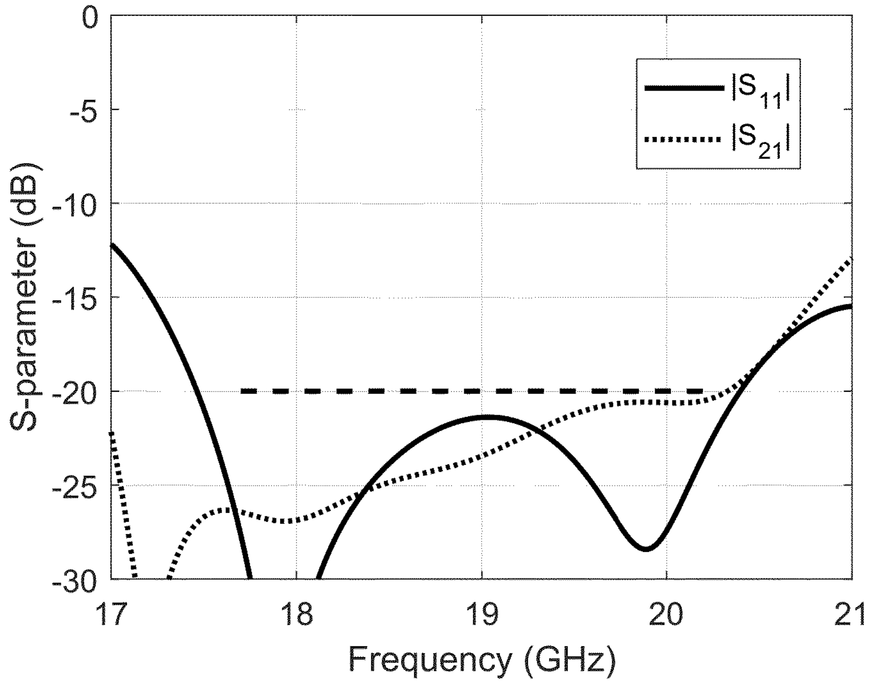
FIGS. 9A-C show graphs of numerical results in a downlink frequency band for an embodiment of the invention.
Figure 9B:
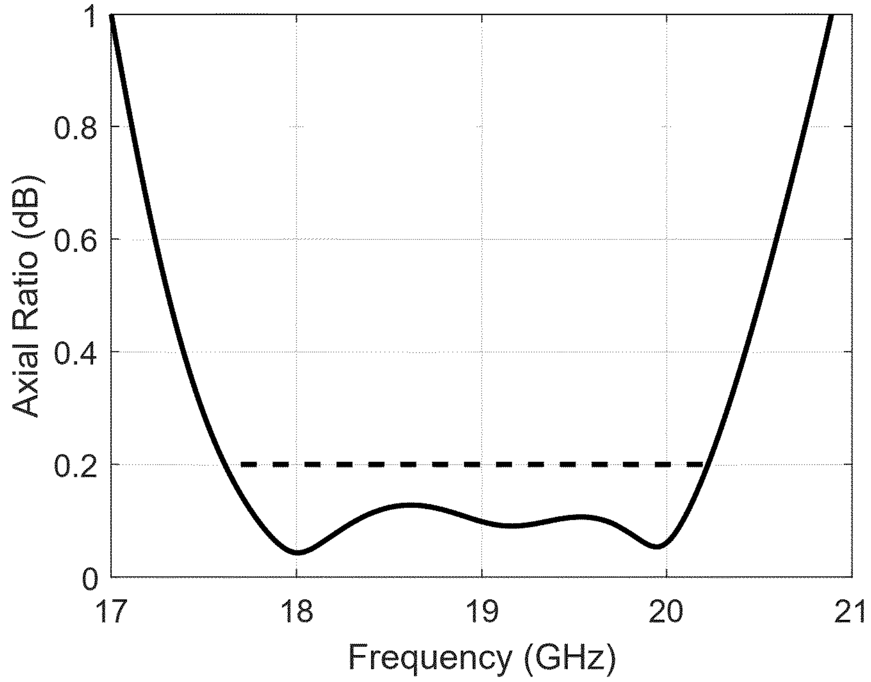
Figure 9C:
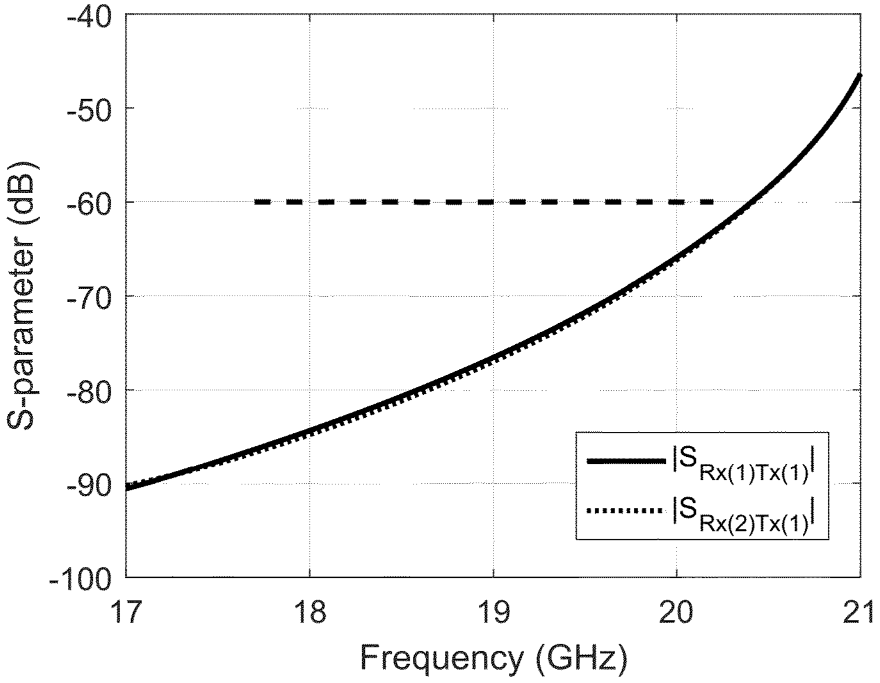
Figure 10A:
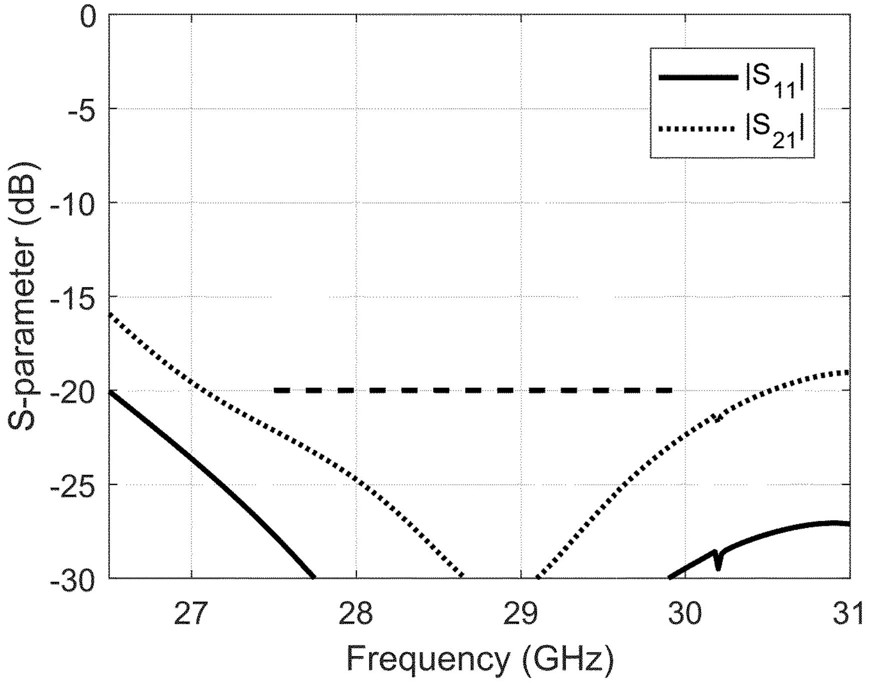
FIGS. 10A-D show graphs of numerical results in an up-link frequency band for an embodiment of the invention.
Figure 10B:
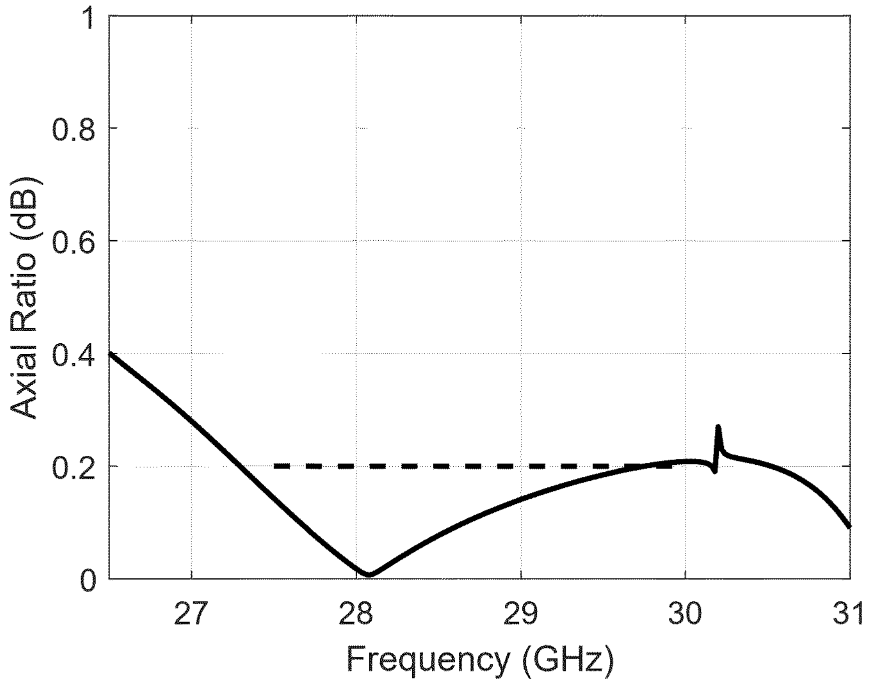
Figure 10C:
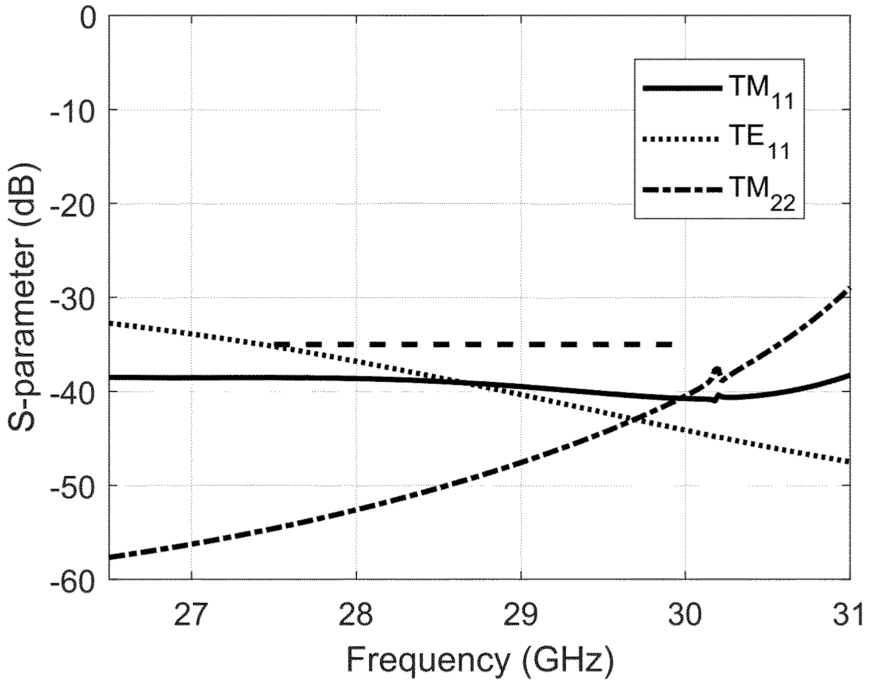
Figure 10D:
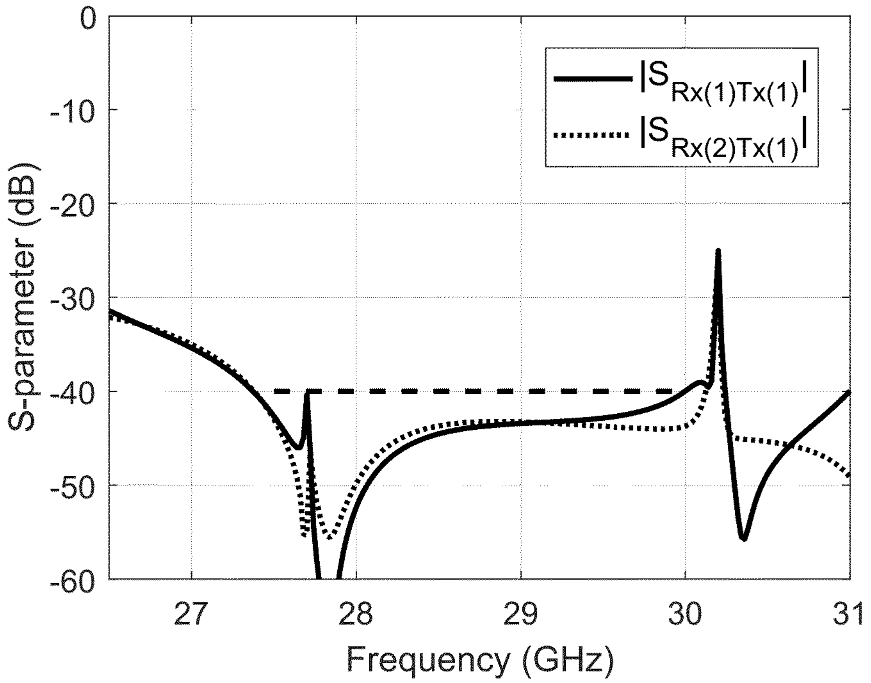

In an analysis of the design using the parameters mentioned above, it was found that the input port reflection and port-to-port isolation were better than −20 dB, that the axial ratio was better than 0.2 dB and that the port-to-port rejection was better than −60 dB over the frequency band of interest for SATCOM down-link (17.7-20.2 GHz). The transmit-to-receive port filtering is obtained with the below cut-off characteristic of an orthomode junction with a change of cross-section in the common waveguide. These numerical results are illustrated in the graphs of FIG. 9.

Within the SATCOM up-link frequency band (27.5-30 GHZ), it was found that the port reflection and port-to-port isolation were also better than-20 dB, that the axial ratio was lower than 0.2 dB and that all higher order modes remained below −35 dB. Using such a filter construction in combination with the feed system, as shown in FIGS. 8A and 8B, a rejection better than −40 dB over the SATCOM up-link frequency band (27.5-30 GHZ) may be obtained, as illustrated in the graphs of FIG. 10. As also shown in the graphs of FIG. 10, the compact feed system described herein handles internal resonances which are known to naturally occur in complex designs due to multipath. FIG. 10 shows that resonances affecting the fundamental modes are kept outside the operating frequency band.

Arrangement of Feed Systems

Figure 11A:
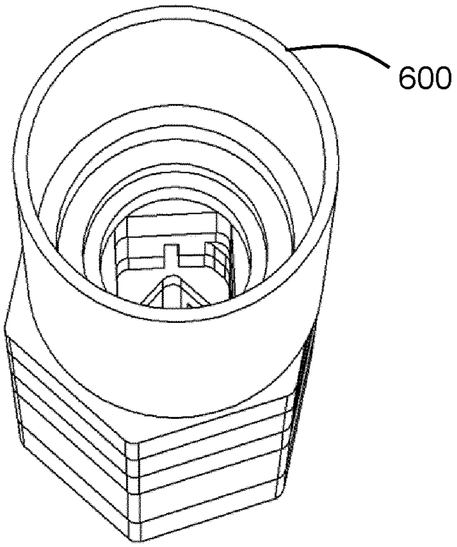
FIG. 11A shows a 3D model of a feed system, including a cylindrical horn antenna, manufactured using CNC milling in a multi-layer approach.
Figure 11B:
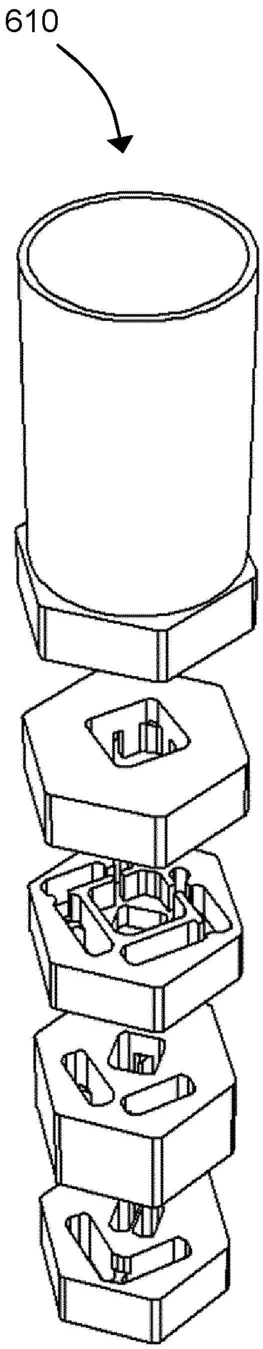
FIG. 11B shows an exploded view of the different layers constituting the feed system of FIG. 11A.
Figure 11C:
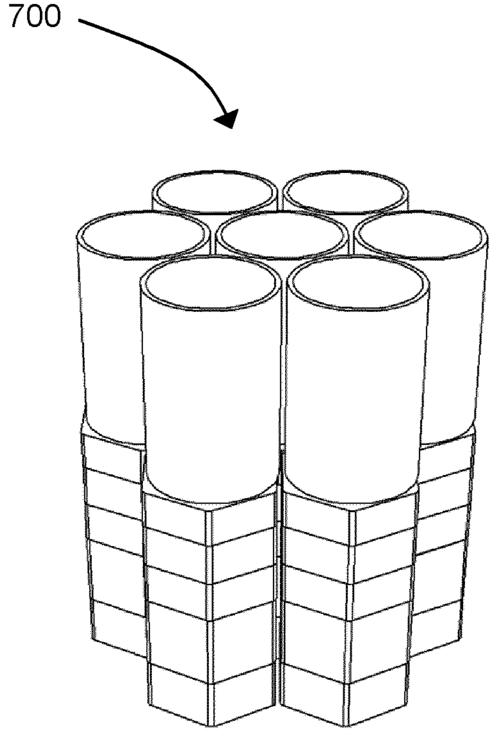
FIG. 11C shows a cluster arrangement of 7 feed systems of FIG. 11A, arranged in a triangular lattice.

A compact feed system 600 such as that illustrated in FIGS. 8A and 8B may be used as a standalone component, or in an arrangement 700 in which individual feed systems are arranged according to a lattice. A standalone feed system 600 may be manufactured using a multi-layer assembly as illustrated in FIG. 11A. An exploded view of the multi-layer assembly 610 of FIG. 11A is illustrated in FIG. 11B. FIGS. 11A-11C illustrate the mechanical design and not the electrical design, thus a representation of the electrically conductive material or electrical conductor is provided, in place of the previously represented inner waveguide cavities. This representation facilitates the view of the multi-layer design. This mechanical design is compatible with standard CNC milling manufacturing techniques, maintaining a minimum wall thickness of 1 mm and sufficient space for the assembly screws. The feed is illustrated in combination with a compact feed horn as required in SATCOM antenna systems. The volume and mass of the standalone component may be further reduced using alternative manufacturing techniques including additive layer manufacturing such as selective laser sintering techniques or diffusion bonding techniques to avoid assembly screws. The compact feed system fits in a hexagonal convex envelop compatible with a triangular lattice 700 of 25 mm at K/Ka-band as schematically represented in FIG. 11C, in which seven standalone feed systems are put side by side to produce a multiple beam feed system. This arrangement of feed systems 700 may be used as a direct radiating array antenna system or as feed system in a reflector antenna configuration.

Figure 12A:
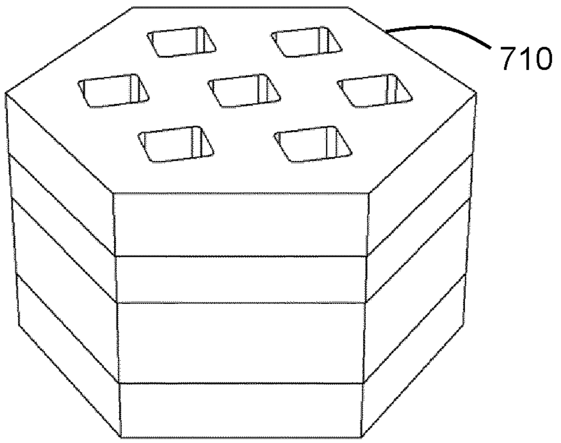
FIG. 12A shows a 3D model of a feed cluster, comprising 7 feed systems according to an embodiment of the invention, manufactured using CNC milling in a matrix multi-layer approach.
Figure 12B:
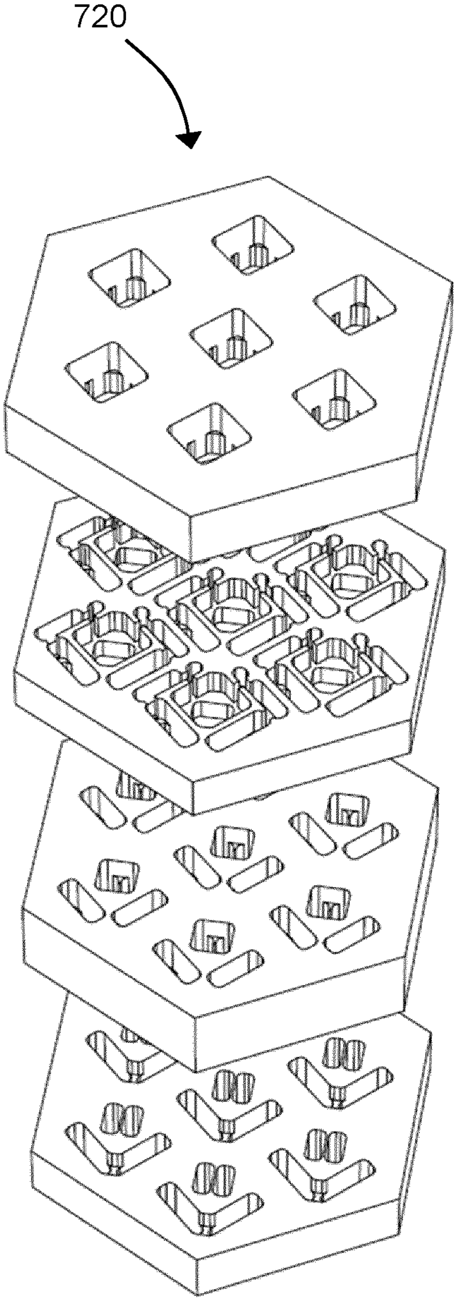
FIG. 12B shows an exploded view of the different layers constituting the feed cluster of FIG. 12A, and FIG. 12C schematically shows the inner waveguide cavities of a feed cluster manufactured in the matrix arrangement of FIG. 12A.
Figure 12C:
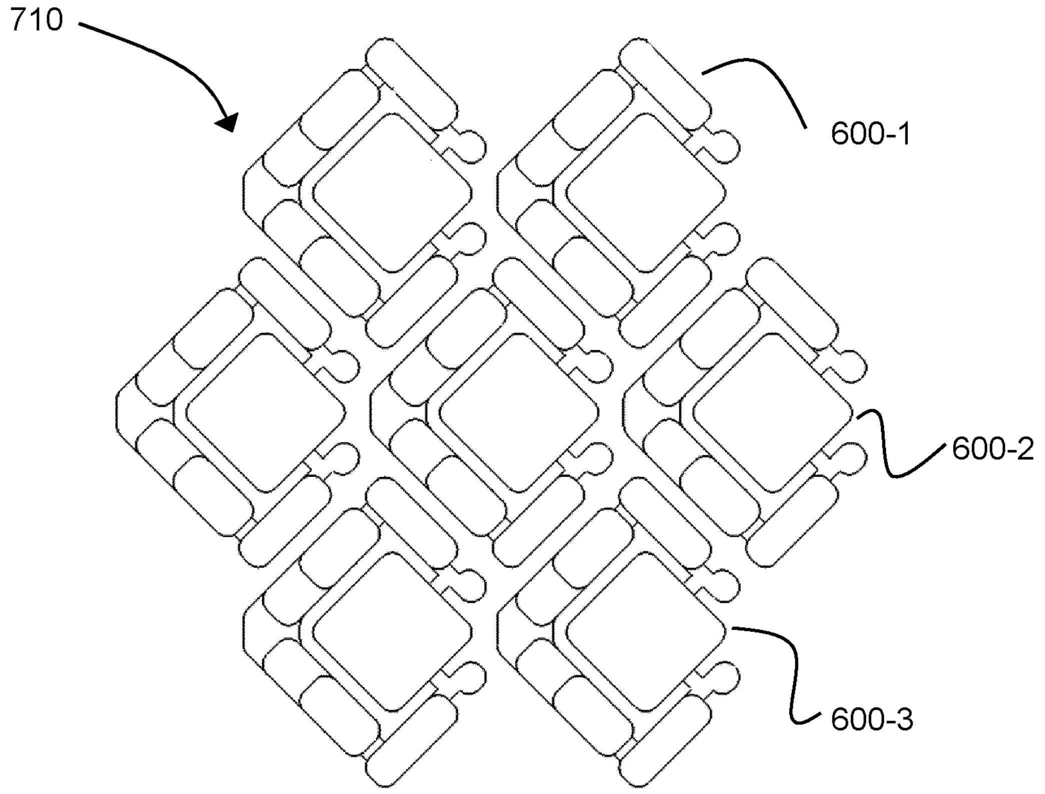

FIGS. 12A-12C show another example of a feed system arrangement 710 which may be represented by a matrix multi-layer assembly 720. FIGS. 12A and 12B illustrate the mechanical design, corresponding to the electrically conductive material or electrical conductor. This arrangement is generally referred to as a matrix arrangement, since the feeds systems are manufactured jointly, as opposed to the arrangement in FIG. 11C where the feeds are manufactured as standalone components. The design described herein and illustrated in FIGS. 12A-12C, particularly when using screwless manufacturing techniques such as additive layer manufacturing and diffusion bonding, may result in a lattice with a spacing as low as 20 mm, in comparison to the more generally achieved ~30 mm minimum spacing for designs at K/Ka-band. In particular, FIG. 12C provides an illustration of the inner waveguide cavities of a matrix arrangement 710 of 7 feeds, highlighting the reduced spacing achieved by removing the constraint imposed by assembly screws. This arrangement ensures a minimum wall thickness of 1 mm in all parts of the feed system.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb “comprise” and its conjugations does not exclude the presence of elements or stages other than those stated in a claim. The article “a” or “an” preceding an element does not exclude the presence of a plurality of such elements. Expressions such as “at least one of” when preceding a list or group of elements represent a selection of all or of any subset of elements from the list or group. For example, the expression, “at least one of A, B, and C” should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A compact feed system comprising:

an orthomode transducer or junction;

a waveguide H-plane directional coupler comprising:

two hollow waveguide sections each providing a respective transmission line in a longitudinal direction of the waveguide H-plane directional coupler;

a coupling section arranged in between the two hollow waveguide sections for coupling a signal from one hollow waveguide section to another hollow waveguide section;

wherein, in a transverse cross-section of the waveguide H-plane directional coupler, the hollow waveguide sections are angled towards the coupling section and delimit a recess formed at an inner side of the waveguide H-plane directional coupler; and wherein the orthomode transducer or junction is positioned at least partially in the recess.

2. The feed system according to claim 1, wherein the hollow waveguide sections and the coupling section are shaped so that an H-plane of the waveguide H-plane directional coupler conforms to a developable surface.

3. The feed system according to claim 2, wherein the developable surface corresponds to a surface part of a cylinder or parallelepiped or hexagonal prism.

4. The feed system according to claim 1, wherein the hollow waveguide sections are curved towards each other in the transverse cross-section of the waveguide H-plane directional coupler.

5. The feed system according to claim 4, wherein the coupling section is curved in the transverse cross-section of the waveguide H-plane directional coupler and has a curvature which follows that of the two hollow waveguide sections.

6. The feed system according to claim 1, wherein at least one of the two hollow waveguide sections has a chamfer or radius on an edge in the transverse cross-section of the waveguide H-plane directional coupler, which edge is nearest to the other hollow waveguide section.

7. The feed system according to claim 6, wherein the chamfer or radius is on one or more edges nearest to the coupling section.

8. The feed system according to claim 1, further comprising a filter for coupling the orthomode transducer or junction to the waveguide H-plane directional coupler.

9. The feed system according to claim 8, wherein the filter comprises at least a stub and an iris, wherein the stub is arranged within a convex envelop of the waveguide H-plane directional coupler, the orthomode transducer or junction, and the iris.

10. An arrangement of a plurality of feed systems each according to claim 1, wherein the feed systems are arranged longitudinally in parallel and transversally in accordance with a lattice.

11. The arrangement according to claim 10, wherein the arrangement of the plurality of feed systems is manufactured as a multi-layer assembly using for example an additive manufacturing technique or CNC milling.

* * * * *